(12) United States Patent
Song et al.

(10) Patent No.: US 8,121,757 B2
(45) Date of Patent: Feb. 21, 2012

(54) BICYCLE USER INTERFACE SYSTEM AND METHOD OF OPERATION THEREOF

(75) Inventors: Stanley Song, Danbury, CT (US); Stephen R. Extance, New Milford, CT (US)

(73) Assignee: Cannondale Bicycle Corporation, Bethel, CT (US)

( * ) Notice: Subject to any disclaimer, the term of this patent is extended or adjusted under 35 U.S.C. 154(b) by 580 days.

(21) Appl. No.: 12/258,525

(22) Filed: Oct. 27, 2008

(65) Prior Publication Data

US 2009/0192673 A1     Jul. 30, 2009

Related U.S. Application Data

(60) Provisional application No. 61/023,201, filed on Jan. 24, 2008.

(51) Int. Cl.
*B62K 23/00* (2006.01)
(52) U.S. Cl. ............................ 701/37; 280/283; 345/156
(58) Field of Classification Search .................. 280/283; 701/37; 345/156
See application file for complete search history.

(56) References Cited

U.S. PATENT DOCUMENTS

| | | | |
|---|---|---|---|
| 5,123,671 A | 6/1992 | Driessen et al. | |
| 5,200,895 A | 4/1993 | Emura et al. | |
| 5,218,353 A * | 6/1993 | Okumura et al. | ........ 340/815.65 |
| 5,295,705 A | 3/1994 | Butsuen et al. | |
| 5,299,488 A | 4/1994 | Kadlicko et al. | |
| 5,921,572 A | 7/1999 | Bard et al. | |
| 5,971,116 A * | 10/1999 | Franklin | .................... 188/282.4 |
| 6,050,583 A | 4/2000 | Bohn | |
| 6,149,174 A | 11/2000 | Bohn | |
| 6,286,642 B1 | 9/2001 | Yi | |
| 6,336,648 B1 | 1/2002 | Bohn | |
| 6,418,360 B1 * | 7/2002 | Spivey et al. | ................... 701/29 |
| 6,600,411 B2 * | 7/2003 | Nishimoto | .................... 340/432 |
| 6,612,599 B2 * | 9/2003 | Miyoshi | ........................ 280/283 |
| 6,636,197 B1 * | 10/2003 | Goldenberg et al. | ......... 345/156 |
| 6,686,911 B1 * | 2/2004 | Levin et al. | .................... 345/184 |

(Continued)

FOREIGN PATENT DOCUMENTS

EP     1568584 A1     8/2005

OTHER PUBLICATIONS

European Search Report and European Search Opinion for European Patent Application No. 09252261, mailed Feb. 10, 2010, 7 pages.

*Primary Examiner* — Paul N Dickson
*Assistant Examiner* — Nicole Verley
(74) *Attorney, Agent, or Firm* — Cantor Colburn LLP

(57) ABSTRACT

A bicycle is disclosed having a control system with a user interface and an active suspension system. The control system includes a one or more sensors arranged to measure and transmit a signal indicative of the terrain over which the bicycle is being ridden. The active suspension system includes a valve box that is fluidly coupled to each chamber of the lower cylinder. An orifice in the valve box is changed in size in response to a signal from a sensor associated with the front wheel that changes the response of the suspension system due to changing terrain conditions. The user interface includes a selection device mounted to the handlebars that allows the user to change parameters of the active suspension system during operation of the bicycle.

15 Claims, 31 Drawing Sheets

U.S. PATENT DOCUMENTS

| | | |
|---|---|---|
| 6,863,291 B2 | 3/2005 | Miyoshi |
| 7,102,626 B2* | 9/2006 | Denny, III .................... 345/179 |
| 7,128,192 B2 | 10/2006 | Fox |
| 7,225,057 B2* | 5/2007 | Froman et al. ................ 700/284 |
| 7,379,798 B2* | 5/2008 | Takeda et al. .................. 701/29 |
| 7,837,595 B2* | 11/2010 | Rice ................................. 482/4 |
| 2003/0171190 A1* | 9/2003 | Rice ............................... 482/57 |
| 2004/0220708 A1* | 11/2004 | Owen et al. ..................... 701/29 |
| 2005/0104857 A1* | 5/2005 | Jacobs et al. .................. 345/169 |
| 2005/0253820 A1* | 11/2005 | Horiuchi ....................... 345/173 |
| 2006/0047372 A1 | 3/2006 | Uno |
| 2006/0064223 A1* | 3/2006 | Voss ............................... 701/52 |
| 2006/0132595 A1* | 6/2006 | Kenoyer et al. ............ 348/14.08 |
| 2006/0293797 A1* | 12/2006 | Weiler ........................ 700/284 |
| 2007/0124675 A1* | 5/2007 | Ban et al. ..................... 715/703 |
| 2007/0213908 A1 | 9/2007 | Guderzo et al. |
| 2007/0281828 A1* | 12/2007 | Rice ................................. 482/4 |
| 2008/0229351 A1* | 9/2008 | Torimaru ....................... 725/14 |
| 2008/0312822 A1* | 12/2008 | Lucas et al. .................. 701/204 |
| 2009/0061450 A1* | 3/2009 | Hunter ............................. 435/6 |
| 2009/0076682 A1* | 3/2009 | Ghoneim ....................... 701/36 |
| 2009/0153691 A1* | 6/2009 | Aoyama et al. ............ 348/222.1 |
| 2009/0192673 A1 | 7/2009 | Song et al. |
| 2009/0213278 A1* | 8/2009 | Tsurumoto et al. ........... 348/734 |

\* cited by examiner

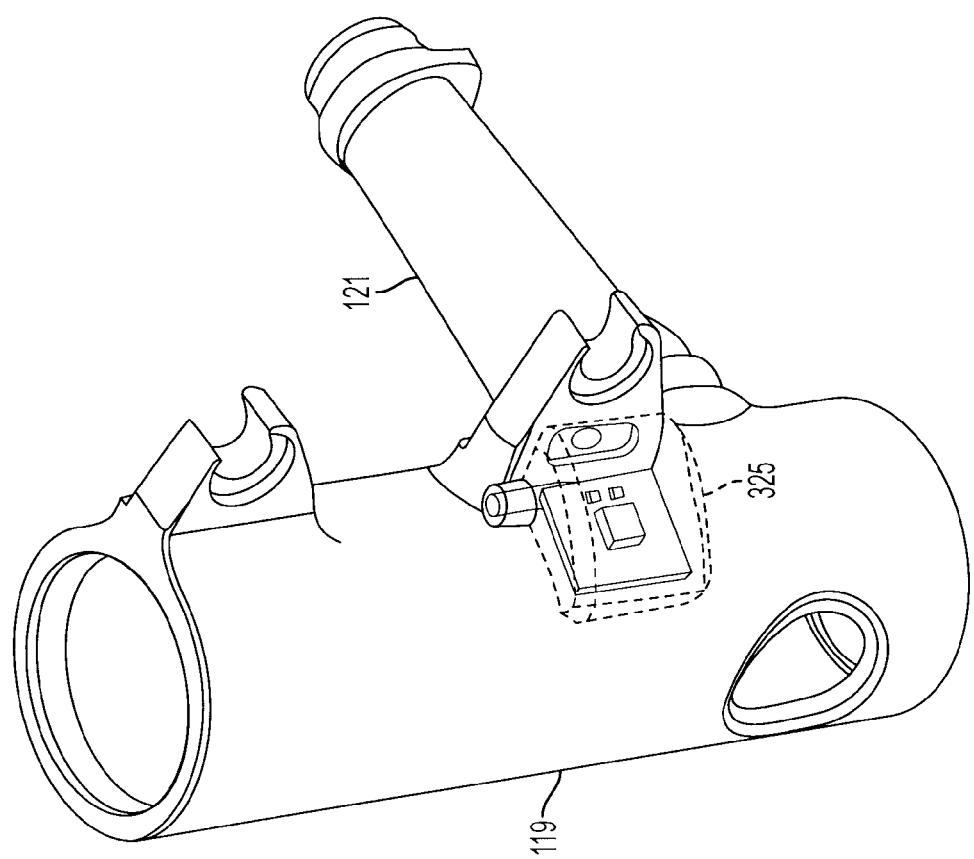

BICYCLE USER INTERFACE SYSTEM AND METHOD OF OPERATION THEREOF

CROSS REFERENCE TO RELATED APPLICATIONS

The present application claims priority to U.S. Provisional Patent Application Ser. No. 61/023,201 entitled "Bicycle Electronic Suspension and Control System and Method of Operation Thereof" filed on Jan. 24, 2008 that is incorporated by reference herein in its entirety.

BACKGROUND OF THE INVENTION

The present disclosure relates generally to a bicycle, and particularly to features of a bicycle, such as a control system, a user interface and a suspension system.

Bicycle suspension systems, such as those used with mountain or all-terrain type bicycles, aid the rider by stabilizing the bicycle through the absorption of energy caused by impacts with the terrain, such as may result from depressions, logs, rocks, stream beds and bumps. Typically, the bicycle suspension system includes a hydraulic system consisting of upper and lower tubes that are arranged to slide axially over each other. A damper valve separates a pair of chambers in the upper and lower tubes. The damper valve controls the flow of a viscous fluid or a gas from one chamber that result in a damping of the impulses caused by the terrain.

During operation, when the bicycle encounters uneven terrain, the outer and inner tubes slide axially to compress in a telescoping manner. This movement of the tubes forces the fluid to flow from one chamber to the other. Subsequently, during a rebound movement, the tubes will slide axially in the opposite direction causing them to expand. The expansion results in the fluid being forced to flow in the opposite direction. Since the valve setting of the damper valve is usually fixed prior to riding, the amount of damping provided by the suspension system may, at times, either be too soft resulting in a loss of energy from the rider, or too stiff resulting in a loss of stability.

To compensate for this, some suspension systems have been proposed that include a mechanical or hydraulic lockout arrangement that prevents the compression or extension of the tubes. This provides efficiency advantages to the rider during periods where the terrain is relatively even, on a street or hard-packed surface for example, since little of the energy exerted by the rider will be absorbed by the suspension system. Still other systems provided arrangements where the suspension system was not activated until the terrain imparted a threshold impact force, typically set at a high level.

While existing suspension systems are suitable for their intended purposes, there still remains a need for improvements particularly regarding bicycle suspension systems and user interface control systems that allow the suspension characteristics to be changed while the bicycle is being operated and in response to terrain conditions.

BRIEF DESCRIPTION OF THE INVENTION

A bicycle damping system is provided that includes a valve box having a first and second fluid path. A cylinder is also included having a first and second chamber with a first shaft arranged coaxially within the cylinder. The first shaft has a first and second end wherein the second end is arranged within the cylinder. The first shaft also has a coaxial borehole fluidly coupled to the valve box first fluid path on a first end of the first shaft. The second end of the first shaft is fluidly coupled to the first chamber. A second shaft is arranged coaxially, outboard of, and coupled to the first shaft. The second shaft is arranged coaxially within the cylinder. The second shaft has a coaxial borehole fluidly coupled on a first end of the second shaft to the valve box second fluid path and to the second chamber on a second end of the second shaft. A piston is coupled to the first shaft and arranged to separate the first and second chambers.

A bicycle control system is also provided having a controller with at least one input and at least one output. A battery is electrically coupled to the controller. A first sensor is also electrically coupled to the controller. A microcontroller is electrically coupled between the controller and the first sensor. The microcontroller comprises a first processor responsive for executing instructions to send a first signal to the controller in response to a signal being received by the microcontroller from the first sensor.

A method of operating a bicycle suspension system with a bicycle control system having a graphical user interface including a processor, a display and a selection device is also provided. The method includes displaying a set of menu entries on the display. Then receiving at the processor and from an operator of the bicycle control system a menu entry selection signal indicative of the selection device pointing at a selected menu entry from the set of the menu entries. A suspension parameter entry is displayed in response to the selected menu entry. The processor receives a suspension parameter selection signal indicative of the selection device having been operated to change the selected suspension parameter. In response to the suspension parameter selection signal, the changed suspension parameter is stored in a memory location.

Another method of operating a bicycle suspension system with a bicycle control system having a graphical user interface including a processor, a display and a selection device is also provided. The method includes the step of displaying a first set of menu entries on the display, wherein the first set of menu entries include at least a ride mode entry, a fork setup entry, a rider setup entry, and a view data entry. A menu entry selection signal is received at the processor and from an operator of the bicycle control system indicative of the selection device pointing at a selected menu entry from the set of the first set menu entries. A set of graphical elements is displayed on said display in response to a selection of the ride mode menu entry. A second set of menu entries is displayed on the display in response to a selection of the fork setup menu entry. Finally, a rider preference parameter is displayed on the display in response to a selection of the rider setup menu entry.

A user interface for a bicycle control system is also provided. The user interface includes a processor and a display coupled to the processor. A selection device is movable between a first position, a second position and a third position. The selection device generates a first signal in response to the selection device being moved to the first position, generates a second signal in response to the selection device being moved to the second position and generates a third signal in response to the selection device being moved to the third position. The processor is further responsive to executable computer instructions for displaying a set of menu entries on the display and moving between the menu entries in response to the first or the second signal. Additionally, the processor is responsive to displaying a suspension parameter entry in response to the third signal.

A product is further provided comprising any feature disclosed herein, either explicitly or equivalently, either individually or in combination with any other feature disclosed herein, in any configuration.

Other embodiments of the invention include a product having any feature disclosed herein, explicitly or equivalently, either individually or in combination with any other feature disclosed herein, in any configuration.

BRIEF DESCRIPTION OF THE DRAWINGS

Referring to the exemplary drawings wherein like elements are numbered alike in the accompanying Figures:

FIG. 13B illustrates a spindle having an accelerometer used in the distributed control system of FIG. 13A

DETAILED DESCRIPTION OF THE INVENTION

An embodiment of the invention, as shown and described by the various figures and accompanying text, provides a bicycle having one or more of the following features: a suspension system having a duel fluid flow arrangement for absorbing energy during operation; a distributed control system having a main controller connected to one or more microcontrollers that manage multiple sensors; a user interface providing positive tactile feedback to the rider; a control system display providing the rider with a means for monitoring the condition and operation of the bicycle; and a menu driven graphical user interface providing a means for the rider to interact with the main controller and adjust different parameters associated with the suspension system. While embodiments described herein illustrate the controller providing a centralized control, multiple controllers could be used independently to provide function control of the various systems and subsystems, such as the suspension for example.

Figure 1:
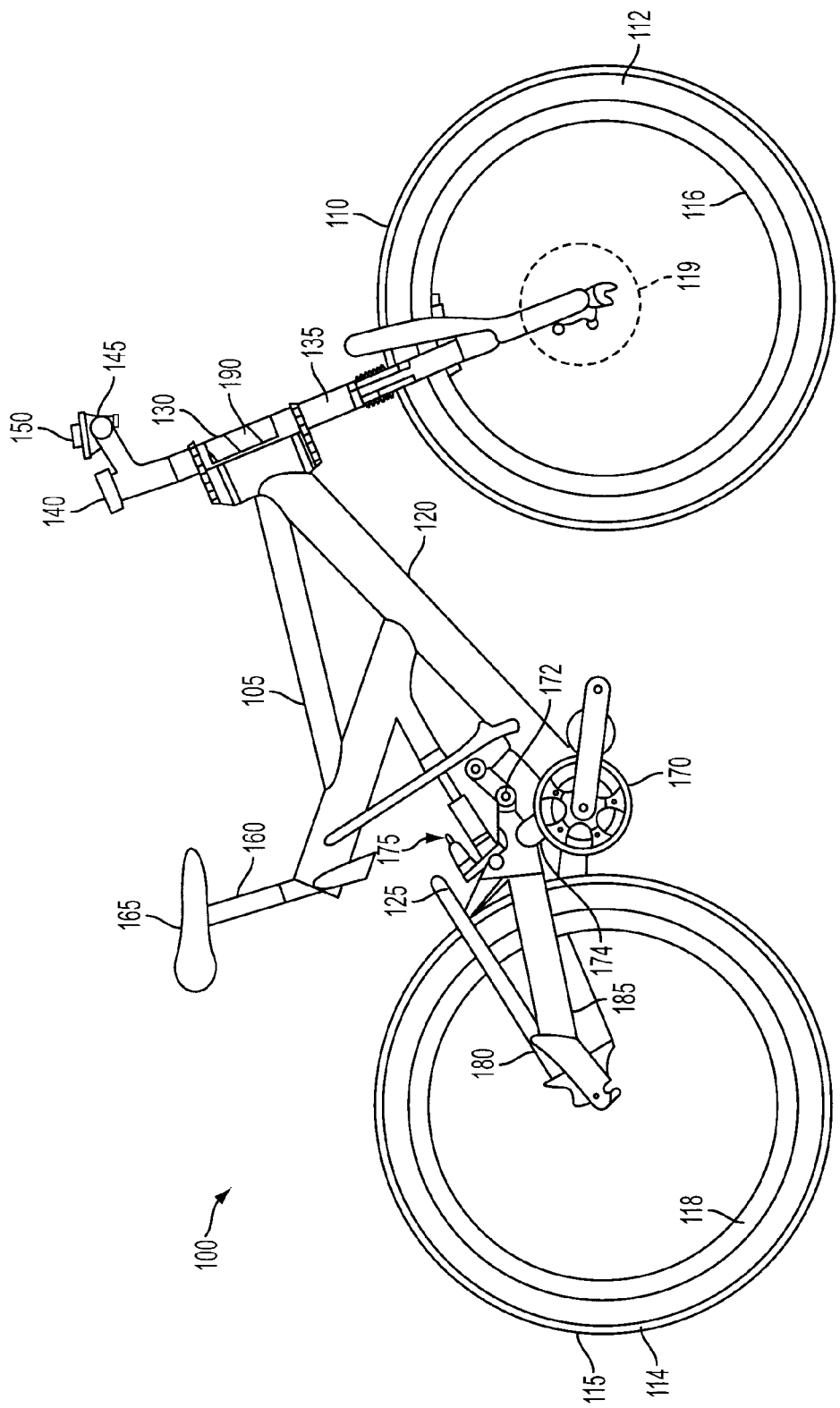
FIG. 1 illustrates a side plan view of an exemplary embodiment of a bicycle in accordance with an embodiment of the invention.
Figure 2:
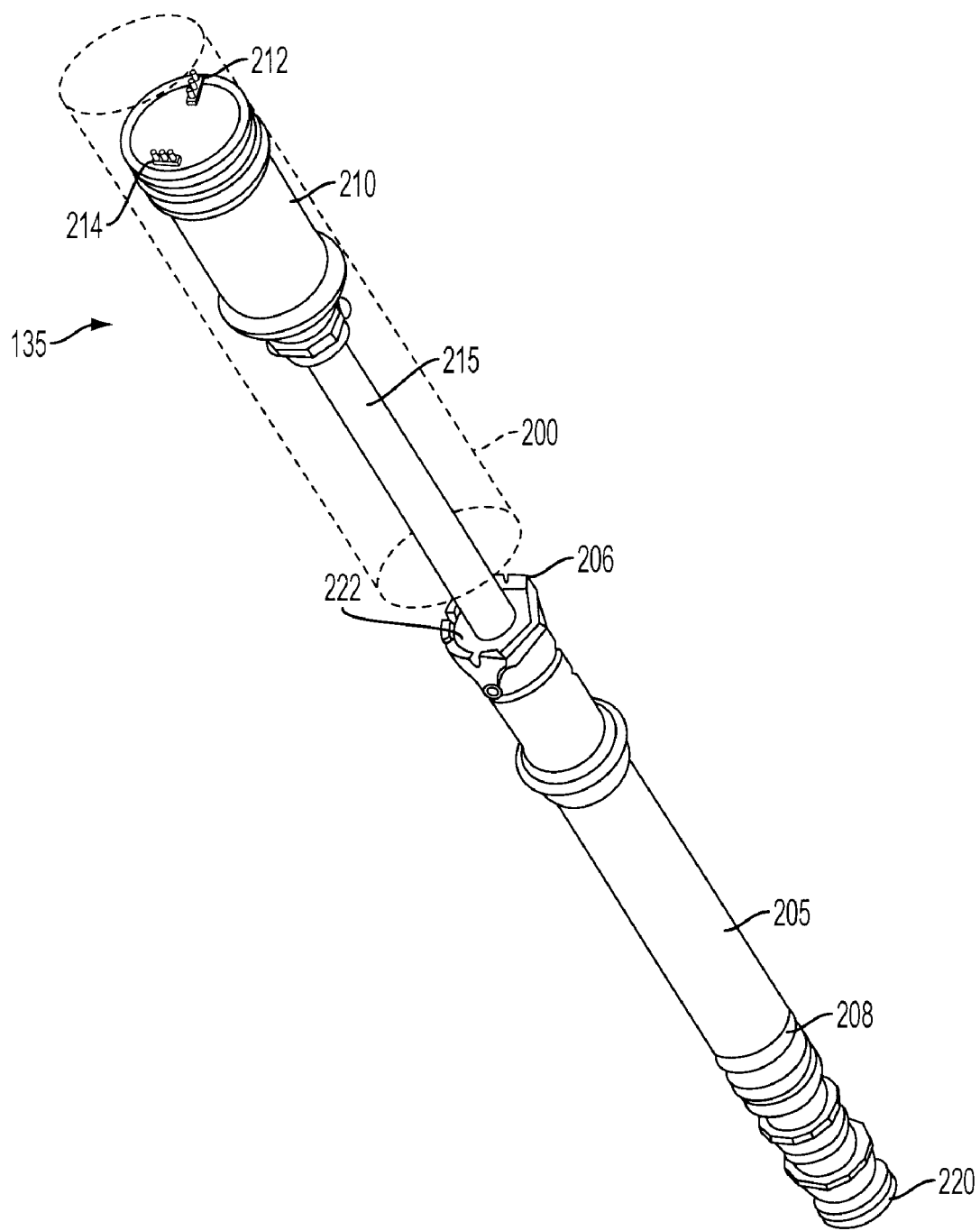
FIG. 2 illustrates an isometric view of a hydraulic suspension system having a valve box in accordance with the exemplary embodiment of FIG. 1.
Figure 3:
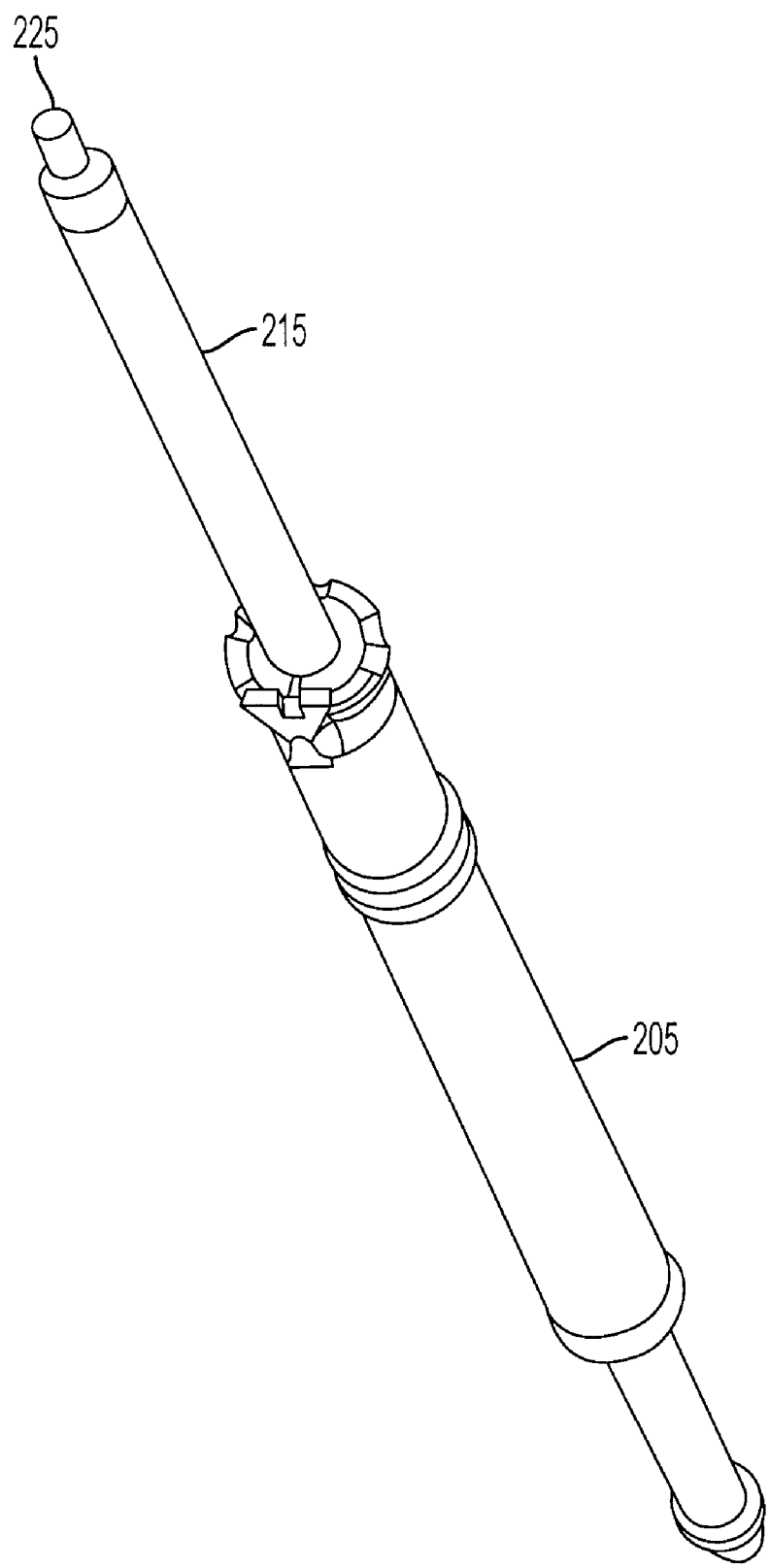
FIG. 3 illustrates an isometric view of the hydraulic suspension system of FIG. 2 with the valve box removed.
Figure 4:
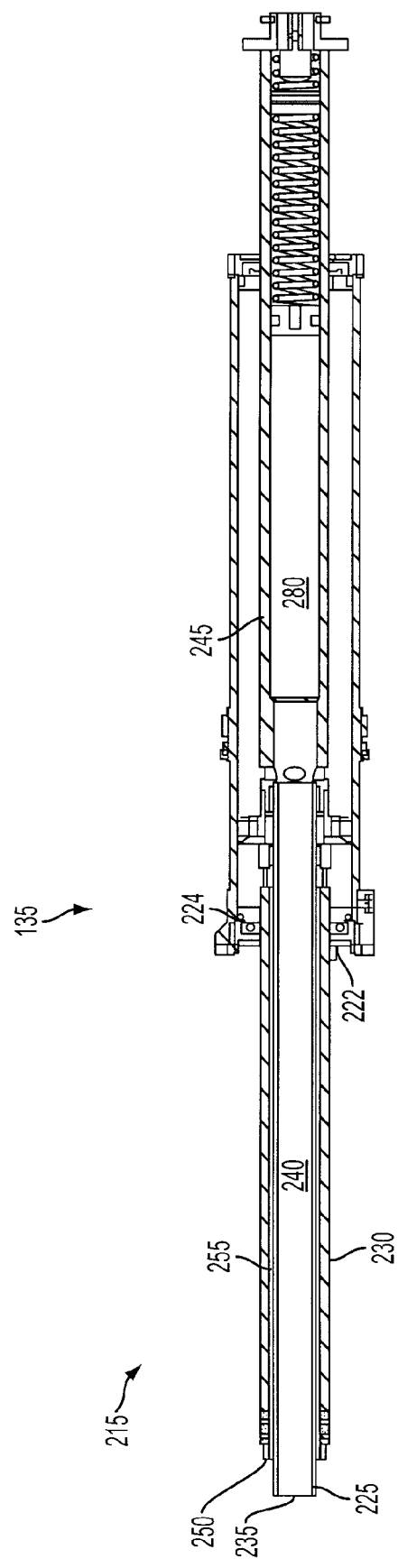
FIG. 4 illustrates a side sectional view of the piston, shaft and cylinder arrangement illustrated in FIG. 3.

FIG. 1 is an exemplary embodiment of a bicycle 100 having a bicycle frame 105 configured to receive front 110 and rear 115 wheels. Each wheel includes an inflatable tire 112, 114 which is supported by a rim 116, 118, respectively. The frame 105 includes a front section 120 and a rear section 125. The front section 120 includes a head tube 130 that is configured and dimensioned to receive a suspension system 135 and to allow a rotational degree of freedom between the head tube 130 and the suspension system 135. The suspension system 135 couples the front section 120 to the front wheel 110. As will be discussed in more detail below, the head tube 130 may also provide a mounting location for a display 140 and a housing for a main controller and battery.

Figure 10:
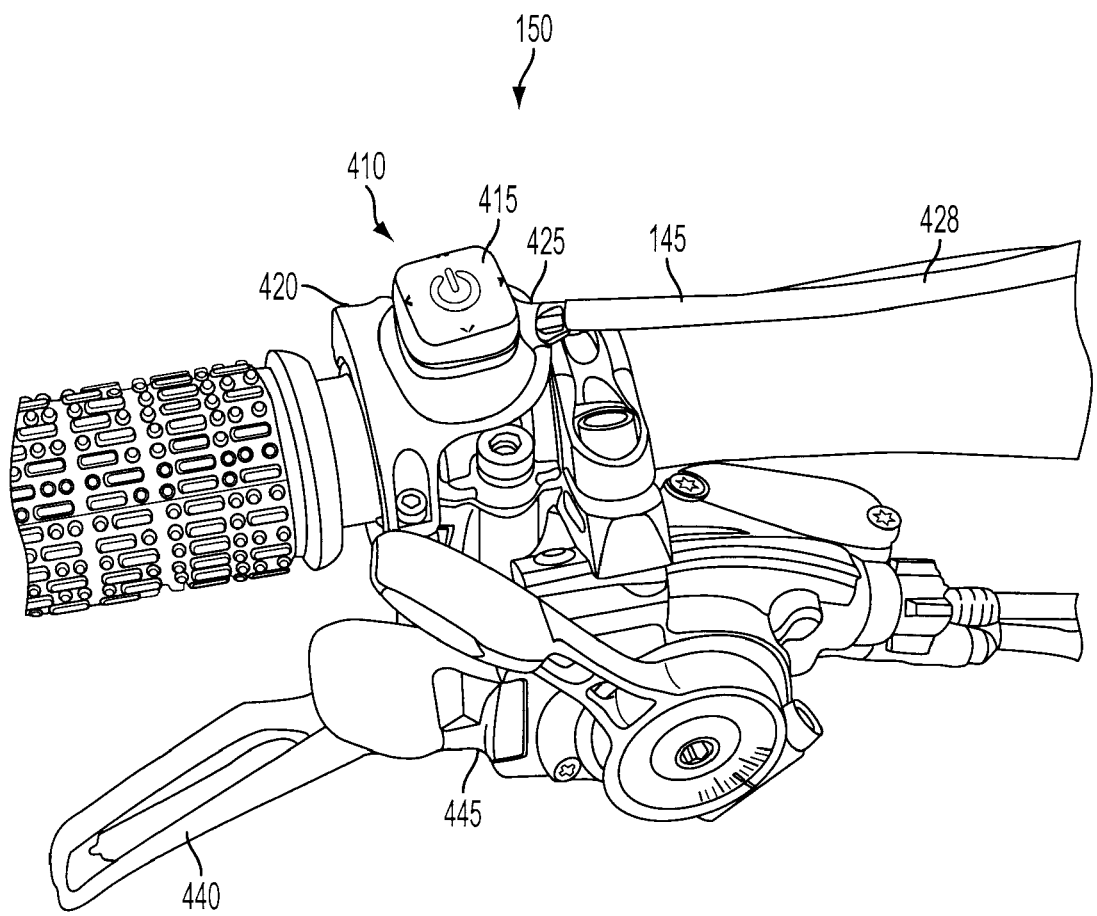
FIG. 10 illustrates an isometric view of the bicycle handle bar with a user interface in accordance with the exemplary embodiment of FIG. 1.

A handle bar 145 is connected to the head tube 130 to allow the rider to rotate the front wheel 110 via the suspension system 135. The handle bar 145 typically has grips and hand brake actuators (FIG. 10). A user interface 150 is mounted to the handle bar 145. On the opposite end of the frame front section 120, a vertically oriented rear seat support 160 fixedly attached to at least one of the front section 120 and the rear section 125 provides support for seat 165. A crank assembly 170 is mounted to the front section 120 below the seat 165. The crank includes a gear assembly and pedals and is typically coupled to a rear wheel gear assembly (not shown) via a chain or other suitable member.

The rear section 125 is coupled to the front section 120 by a pair of linkages 172, 174 and a rear suspension system 175. The rear section 125 includes an upper tube 180 and a lower tube 185 that connect the rear wheel 115 to the front section 120. It should be appreciated that the linkages 172, 174 and rear suspension 175 pivot, allowing the rear section 125 to move independently in the same plane as the front section 120. This type of bicycle, sometimes referred to as a full suspension type, provides energy absorption and damping for both wheels 110, 115 of the bicycle 100. In an alternative embodiment, the rear suspension 175 may be omitted, creating a bicycle type sometimes referred to as a hard tail, and the rear section 125 would be fixedly attached to the front section 120.

As will be described in more detail below, the bicycle 100 also includes a control system 190. The control system 190 provides the communications and processing for the operation of subsystems of bicycle 100, such as the suspension system 135 for example, or to provide data collection and feedback to the rider. In the exemplary embodiment, the control system 190 has a main controller 400 (FIG. 9) located within the head tube 130.

While exemplary embodiments described herein will refer to the front suspension in the singular, with a single assembly providing the desired damping functionality, other embodiments are also possible and considered within the scope of the present claims. For example, the bicycle 100 may have a front fork that couples on both sides of the front wheel 110. In this embodiment, a single suspension system may be incorporated, or each side of the fork may have a separate suspension system. Alternatively, the front "fork" arrangement with suspension may be arranged on only one side of the bicycle (still referred to as a "fork" even though one "tine" is absent), such as the left side, which is sometimes referred to as a lefty. Further, the descriptions and functionality of the suspension system 135 would apply equally to the rear suspension 175.

Referring to FIGS. 2-6, the exemplary embodiment of the front suspension 135 will be described. The suspension system 135 is housed within an upper 200 and lower 205 cylinder that are arranged to slide axially over each other during operation. In the exemplary embodiment, a valve box device 210 is arranged within the upper cylinder 200 and fixedly attached to one end of a shaft assembly 215. The valve box 210 has one or more electrical connections 212 and communications connections 214. As will be described in more detail below, the connections 212, 214 provide electrical power and communication signals from the bicycle control system 190.

In the exemplary embodiment, the suspension system 135 is a "through-shaft" type design, and the shaft assembly 215 enters through a first end 206 of the lower cylinder 205 and exits a second end 208 where the shaft assembly 215 attaches to an air piston 220. The lower cylinder first end is sealed by an end plate 222 that includes an opening sized to allow penetration by the shaft assembly 215. One or more seals 224, such as an o-ring seal or u-cup seal for example, are incorporated into the end plate 222. The seals 224 allow the shaft assembly 215 to move relative to the lower cylinder 205 while containing fluids within the lower cylinder 205 and keeping dust and debris out.

Figure 5A:
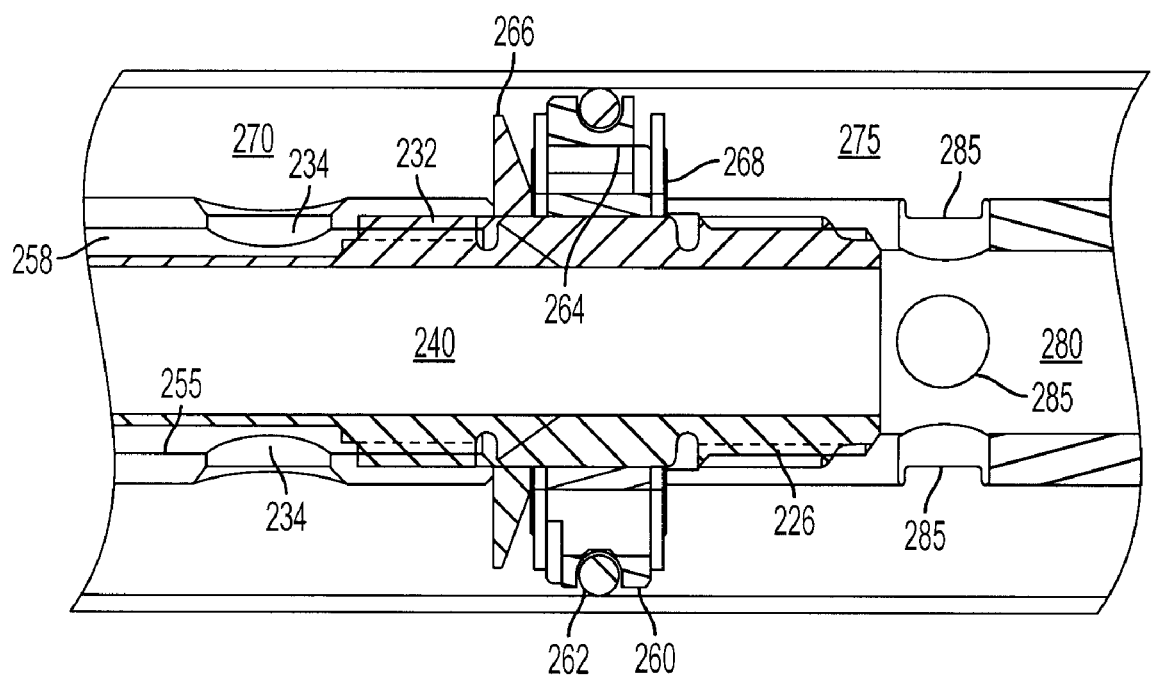
FIG. 5A illustrates a detail sectional view of the hydraulic suspension system of FIG. 4.
Figure 5B:
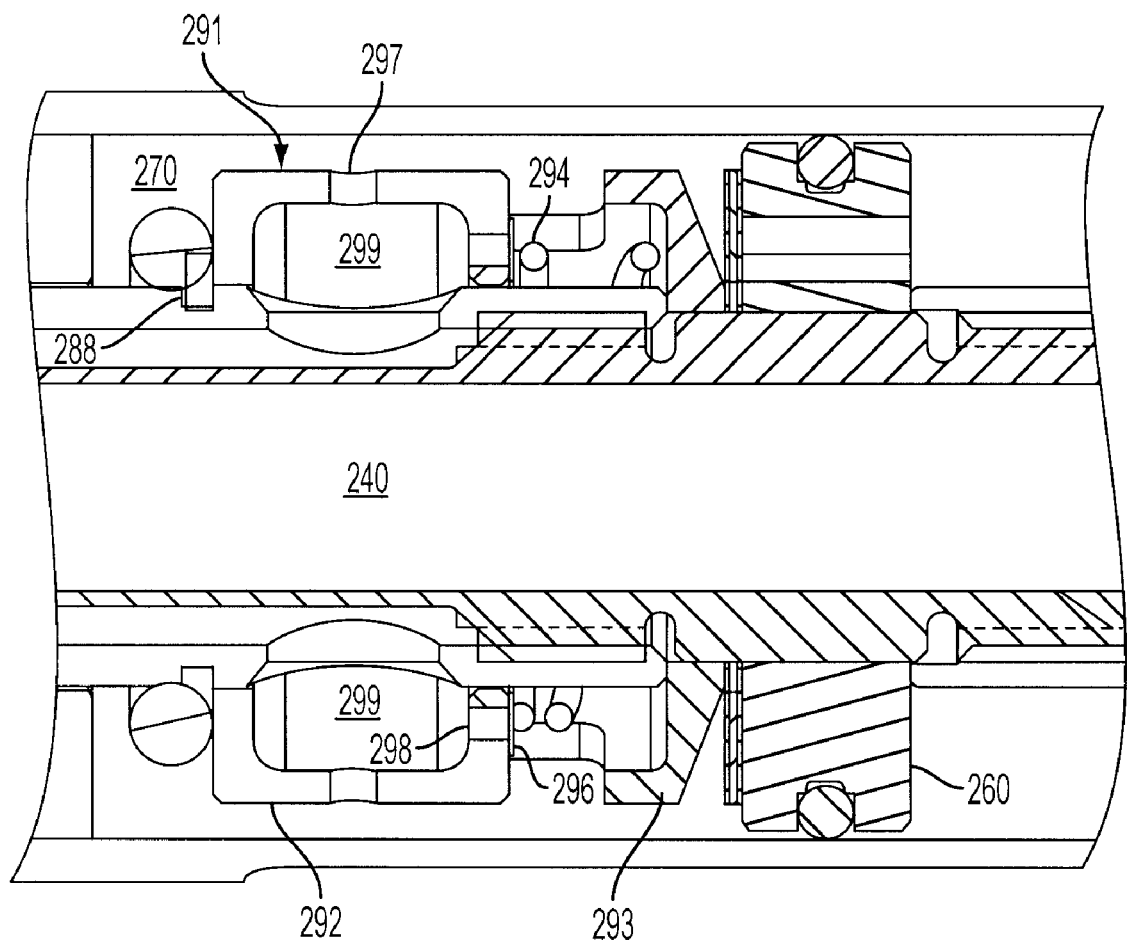
FIG. 5B-5E illustrates a detail sectional view of an alternate embodiment suspension system of FIG. 4.
Figure 5C:
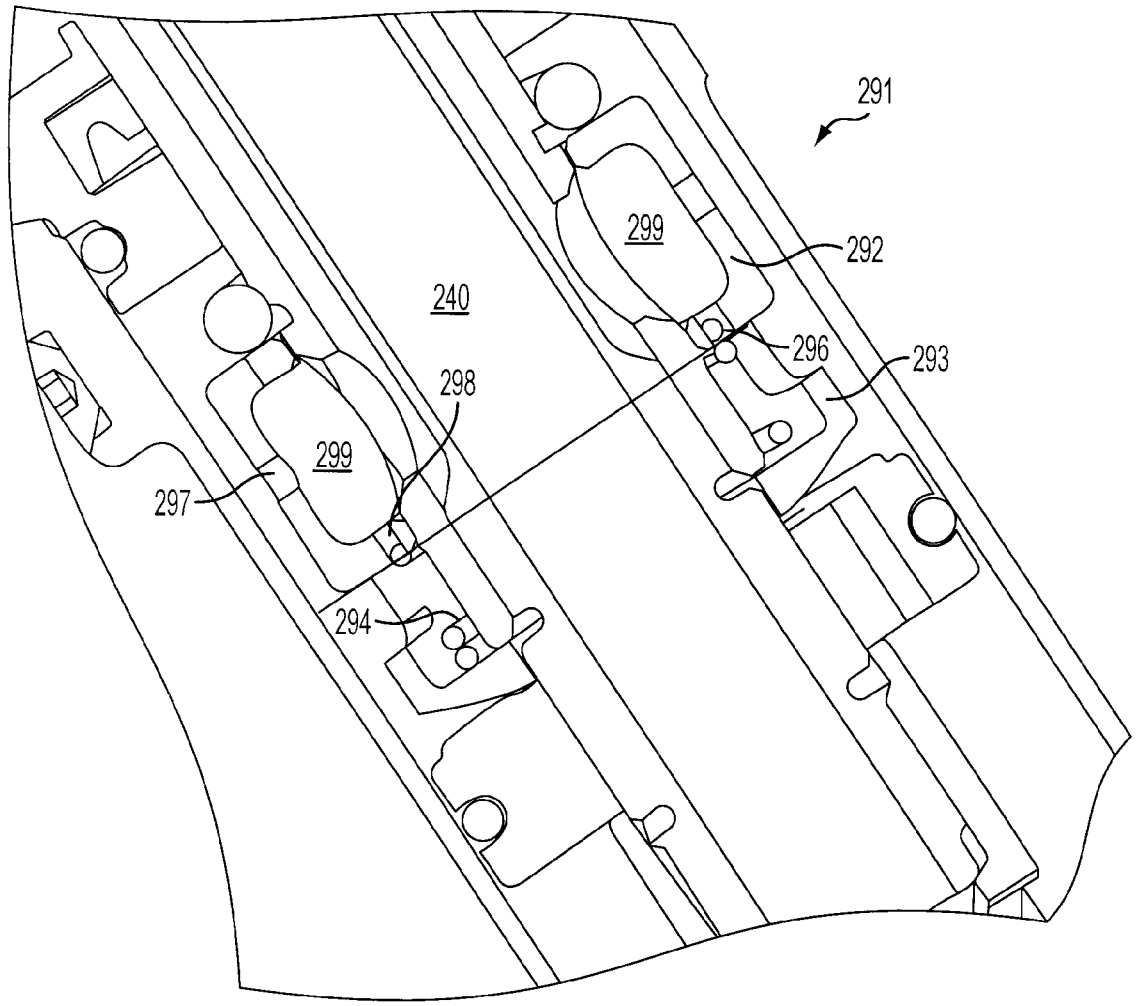
Figure 5D:
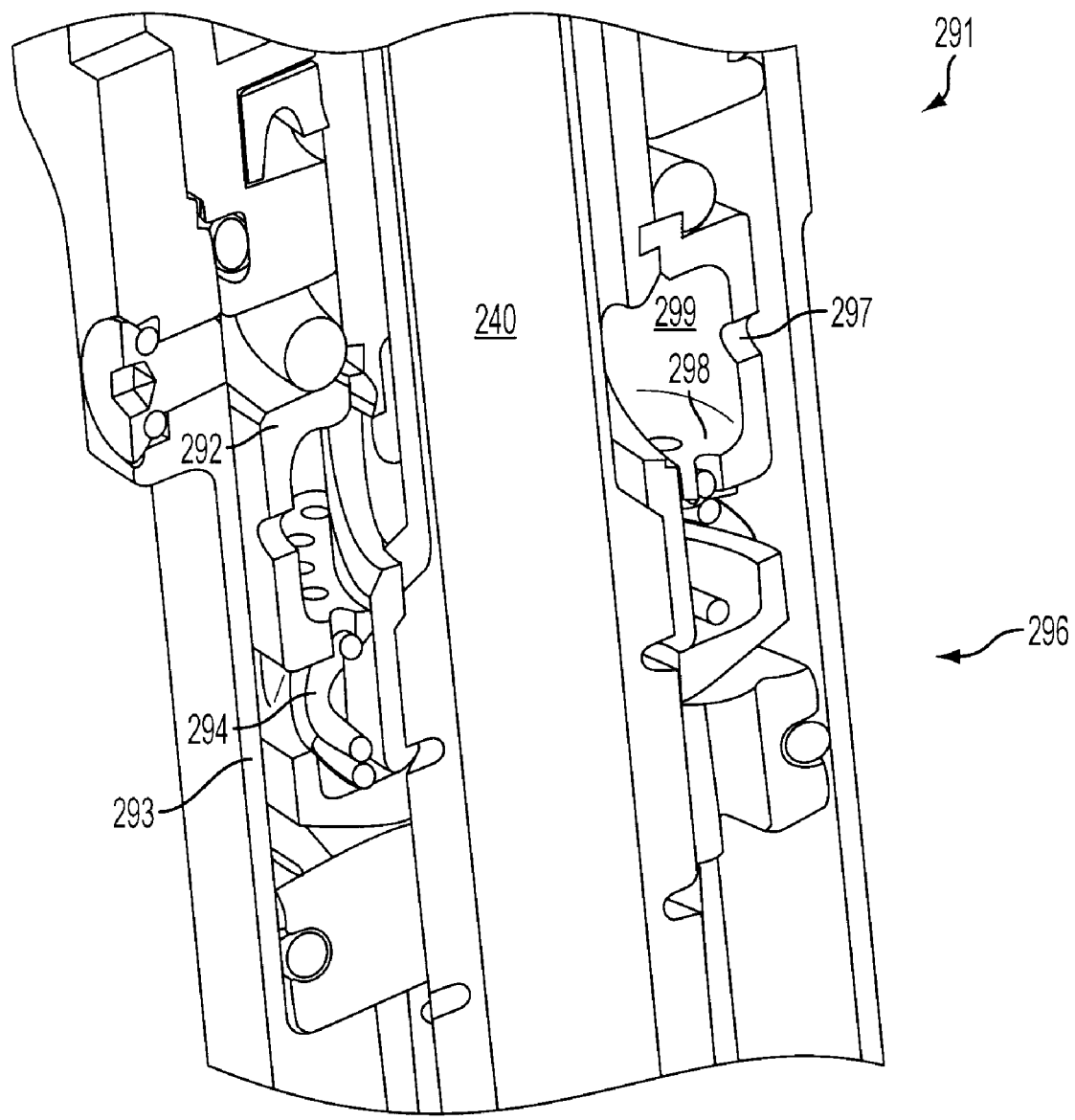
Figure 5E:
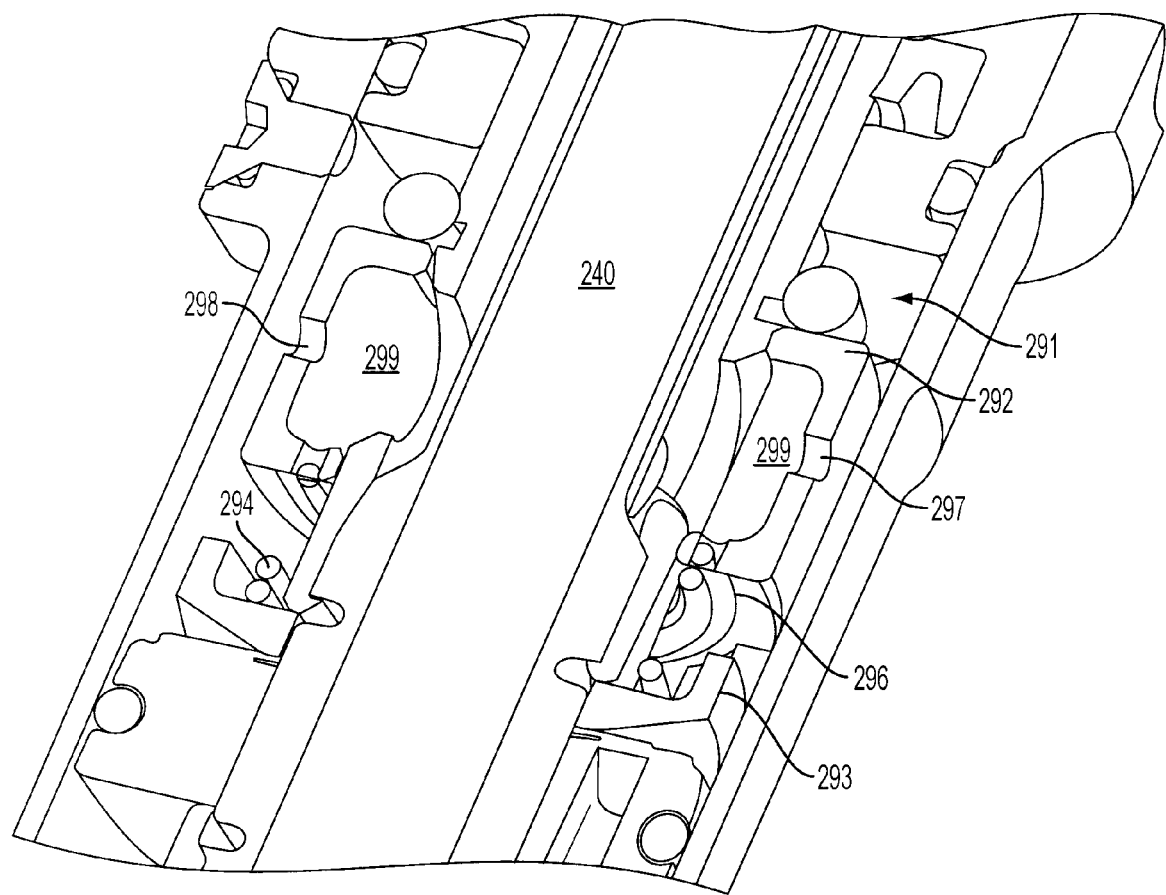

The shaft assembly 215 includes an inner shaft 225 and an outer shaft 230. The inner shaft 225 is a cylinder having an open end 235 and a borehole 240 that extends therethrough. In the exemplary embodiment, the inner shaft 225 is fixedly attached to a lower shaft 245 by a threaded portion 226 (FIG. 5A). Similarly, the outer shaft 230 is a cylinder having an open end 250 and a borehole 255 that extend therethrough. The inner shaft 225 and outer shaft bore hole 255 are sized to create a gap 258 between the outer surface of the inner shaft 225 and the inner surface of the outer shaft 230. One or more holes 234 are formed in the outer shaft 230 which intersect with the borehole 255. As will be described in more detail below, the gap 258 is sized sufficient to allow the flow of oil through the borehole 255 and allows an exchange of fluid between the borehole 255 and the cylinder 205 through the holes 234. The outer shaft 230 is fixedly attached to the inner shaft 225 by a threaded portion 232.

The lower shaft 245 includes a borehole 280 that is coupled to the inner shaft borehole 240. One or more holes 285 extend through the wall of lower shaft 245. As will be described in more detail below, the holes 285 allow the exchange of fluid between the inner shaft 225, the lower shaft 245 and the lower cylinder 205. The lower shaft 245 further couples the outer shaft and inner shaft 235 to the air piston 220.

A piston 260 is coupled to the inner shaft 225 and is captured between the lower shaft 245 and the outer shaft 230. An optional spacer 266 and shim 268 may be arranged on either side of piston 260 to aid in assembly and maintain a proper fit. Shim 268 may also aid in the control of the rate of fluid exchange between the lower chamber 275 and upper chamber 270. The piston 260 is positioned within the lower cylinder 205 and divides the lower cylinder into an upper chamber 270 and a lower chamber 275. The piston 260 includes a seal 262, such as an o-ring for example, that allows the piston to move relative to the lower cylinder 205 without allowing fluid to pass from the upper chamber 270 to the lower chamber 275 along the outside diameter of the piston 260. As will be described in more detail below, one or more orifices 264 in the piston 260 are arranged to allow a controlled rate of fluid exchange between the lower chamber 275 and the upper chamber 270.

An alternate embodiment shaft assembly 215 is illustrated in FIGS. 5B-5E. In this embodiment, a check valve 291 is positioned adjacent to the piston 260. The check valve 291 is comprised of a valve body 292 positioned adjacent to a piston spacer 293. A spring 294 is positioned within piston spacer 293 to hold a flapper plate 296 against the valve body 292. The valve body 292 includes a chamber 299 that is fluidly connected to the upper chamber 270 by rebound stroke holes 297 and compression stroke holes 298. The number of holes 297, 298 in valve body 292 may be changed to provide the desired performance. In the exemplary embodiment, the cumulative open area of the compression holes 298 is larger than the cumulative open area of rebound holes 297. The compression stroke holes 298 are positioned adjacent the flapper plate 296. It should be appreciated that the spring only provides a light force sufficient to hold the flapper plate 296 against the valve body 292. The check valve 291 is retained in position by a fastener, such as snap ring 288 that is coupled to the inner shaft 225.

During operation, when the shaft assembly 215 enters the rebound stroke, oil flows from upper chamber 270 through rebound stroke holes 297 into valve chamber 299, via the valve box 210 as is described in more detail below, and subsequently into the inner shaft bore holes 240. Due to hydraulic pressures in the upper chamber 270, the flapper plate 296 remains against the valve body 292 preventing fluid flow through the holes 298. When the shaft assembly 215 enters compression stroke portion of operation, fluid flows from the borehole 240 into the chamber 299 via the valve box 210 as is described in more detail below. Due to the increase in pressure in the chamber 299, the hydraulic pressure against the plate 296 causes the spring 294 to compress allowing fluid to flow through the compression holes 298. Since the opening area of the compression holes 298 is larger than the rebound holes 297, the compression holes 298 become the primary fluid flow path through the check valve 291 during the compression stroke. It should be appreciated by changing the size of holes 297, 298 different rates of fluid flow may be accomplished independent of the valve box 210 during different modes of operation.

Figure 6:
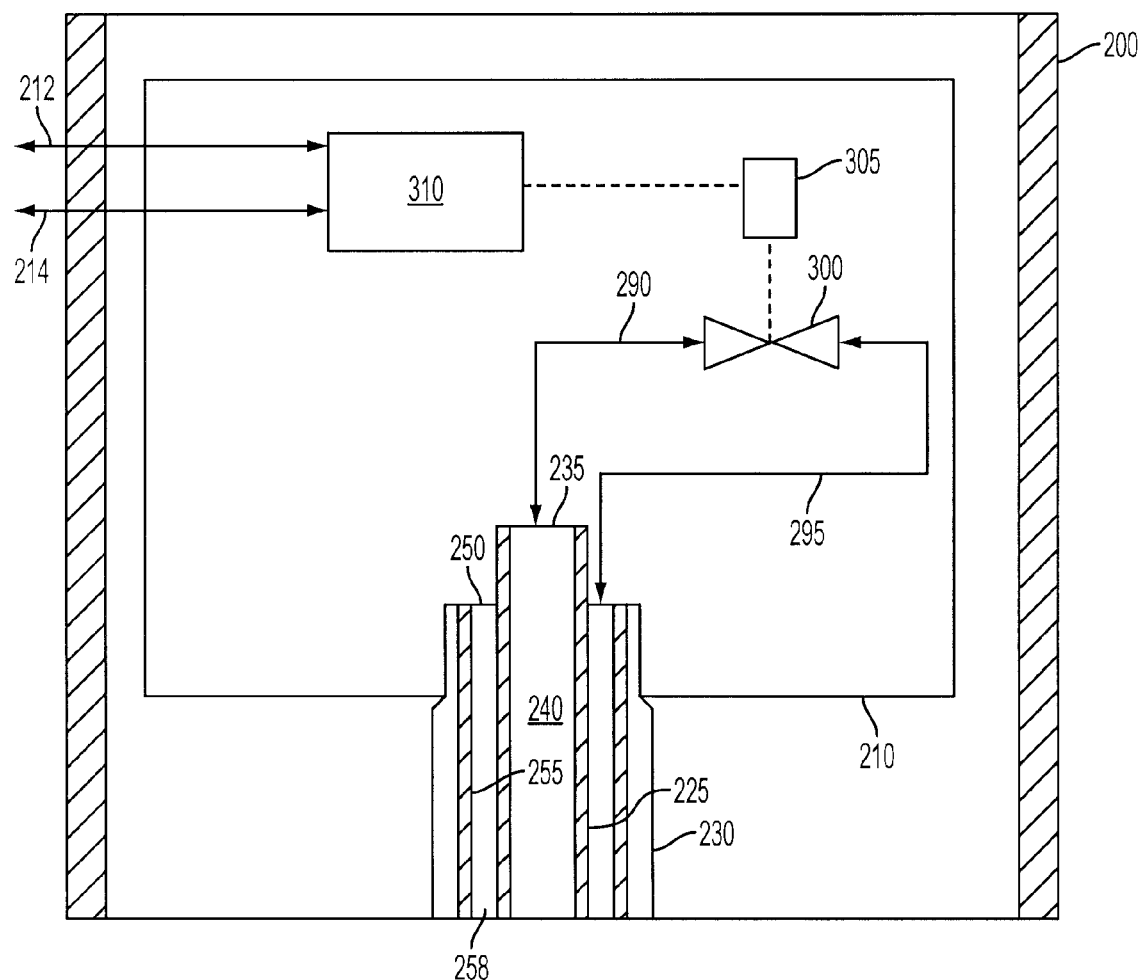
FIG. 6 illustrates a schematic representation of the valve box of FIG. 2.

In the exemplary embodiment, the valve box 210 is fixedly attached to the end of the shaft assembly 215 as shown in FIG. 6. The valve box 210 includes at least a first fluid path 290 fluidly coupled to the inner shaft bore 240, and a second fluid path 295 that is fluidly coupled to the outer shaft bore 255.

The first fluid path and second fluid path are coupled by a valve 300 to allow the bi-directional exchange of fluid between the inner shaft bore 240 and the outer shaft and the outer shaft bore 255. The valve is actuated by a motor 305, which controls the size of an orifice (not shown) in the valve 300. By changing the size of the orifice, the rate of fluid flow through the valve box 210, and thus the amount of damping provided by the suspension system 235 may be adjusted. The motor 305 is electrically connected to a motor controller 310 that provides electrical power to control the motor 305. As will be described in more detail below, the motor controller 310 is coupled to the bicycle control system through electrical and communications connections 212, 214.

During operation, as the bicycle 100 traverses over uneven terrain, the impact of the front tire on an obstacle, such as a depression for example, is transmitted through the suspension system 135. This impact force is detected by sensors 315, 320, which transmit a signal to the bicycle control system 190. In the exemplary embodiment, the sensor 315 is a an optical encoder such as that described in U.S. Pat. No. 5,971, 116 entitled "Electronic Suspension System for a Wheeled Vehicle" which is incorporated herein by reference in its entirety. The optical encoder 315 is mounted on the upper cylinder 200 and detects markings on an encoder strip 316 mounted to the shaft assembly 215. Based on the number of marks on the encoder strip 316 counted by the optical encoder 315 during a given time period, the main controller 190 can calculate the velocity and acceleration of the shaft due to the impact on tire 110. In the exemplary embodiment, the sensor 320 is a Hall effect sensor that detects the absolute position of the shaft assembly 215.

As will be discussed in more detail below with respect to the operation of the bicycle control system 190, the amount of damping provided by suspension system 135 will depend on the terrain, the rider's preferences and the rider's physical characteristics (for example, weight). Using these parameters, the control system 190 adjusts the orifice size of valve 300 to either allow more fluid flow (more damping) or less fluid flow (less damping). During typical riding conditions, a portion of the impact is damped by the tire 112 and rim 116. Typically, the tire 112 and rim 116 take between 9 milliseconds and 12 milliseconds to deform upon impact. This deformation damps the impact and extends the amount of time between impact and when the suspension system 135 starts to react. In the exemplary embodiment, an accelerometer 325 is mounted within the lower spindle 119 as shown in FIG. 13B and FIG. 13C. The spindle 119 includes a protrusion 121 that couples the suspension system 135 to the front wheel 110 through hub bearings (not shown). The accelerometer 325 measures the impact and transmits the acceleration information to the control system 190. In the exemplary embodiment, control system 190 receives the signal from accelerometer 325 and transmits the valve command to motor controller 310 in less than 12 milliseconds and preferably less than 11 milliseconds after the impact.

The suspension system 135 includes a viscous fluid, such as oil, that fills the upper chamber 270, lower chamber 275 and the bore holes 240, 255. When the tire 110 impacts an obstacle, the sensors 315, 320, 325 transmit a signal to the controller system 190 that calculates the desired amount a damping in accordance with a selected set of parameters. The control system 190 then converts the desired damping characteristic into an orifice size for the orifice of valve 300 and transmits a signal to motor controller 310 which adjusts the valve 300 in turn. During compression mode (initial damping in response to impact), the piston 260 moves down the lower cylinder 205 (that is, away from end plate 222) reducing the size of lower chamber 275. This compression of the fluid in lower chamber 275 results in fluid flowing through holes 285 in lower shaft 245, into bore 280 and subsequently into bore 240 in inner shaft 225. This fluid flow continues into the valve box 210, through first fluid path 290 and into the valve 300. Thus, the rate of fluid flow, and damping provided by suspension system 135 may be adjusted by the changing the size of the orifice in valve 300.

After exiting the valve 300, the fluid movement continues through second fluid path 295 and into outer shaft bore 255. The fluid flows within gap 258 and through holes 234 into the upper chamber 270. In the exemplary embodiment, simultaneously with the fluid flow through the shaft assembly 215 and valve box 210, an additional amount of fluid flows through the fixed orifice holes 264 in piston 260. The incorporation of orifices 264 provides a parallel path for fluid flow between the upper chamber 270 and the lower chamber 275. This parallel path provides additional flexibility by reducing the range of orifice sizes that valve 300 needs to achieve. It should be appreciated that the amount of travel in the suspension system is limited, as is the amount of energy that may be absorbed. As the amount of travel increases, the stiffness of suspension system decreases. However, certain impacts may require more fluid flow than the suspension system 135 can accommodate. Under these conditions the suspension system 135 may experience a phenomena known as "hydraulic lock". During hydraulic lock, the damping forces increase exponentially and the rider experiences what feels like a rigid fork. A secondary flow path relieves this pressure and avoids the hydraulic lock condition.

After the initial impact is damped, the suspension system 135 enters a rebound mode where the piston 260 moves up the lower cylinder 205 (that is, closer to end plate 222). The reversals of movement by the piston 260 also reverses the flow of fluid out of upper chamber 270, through the gap 258, valve box 210 and eventually back into the lower chamber 275 via inner shaft 225 and holes 285.

Figure 7:
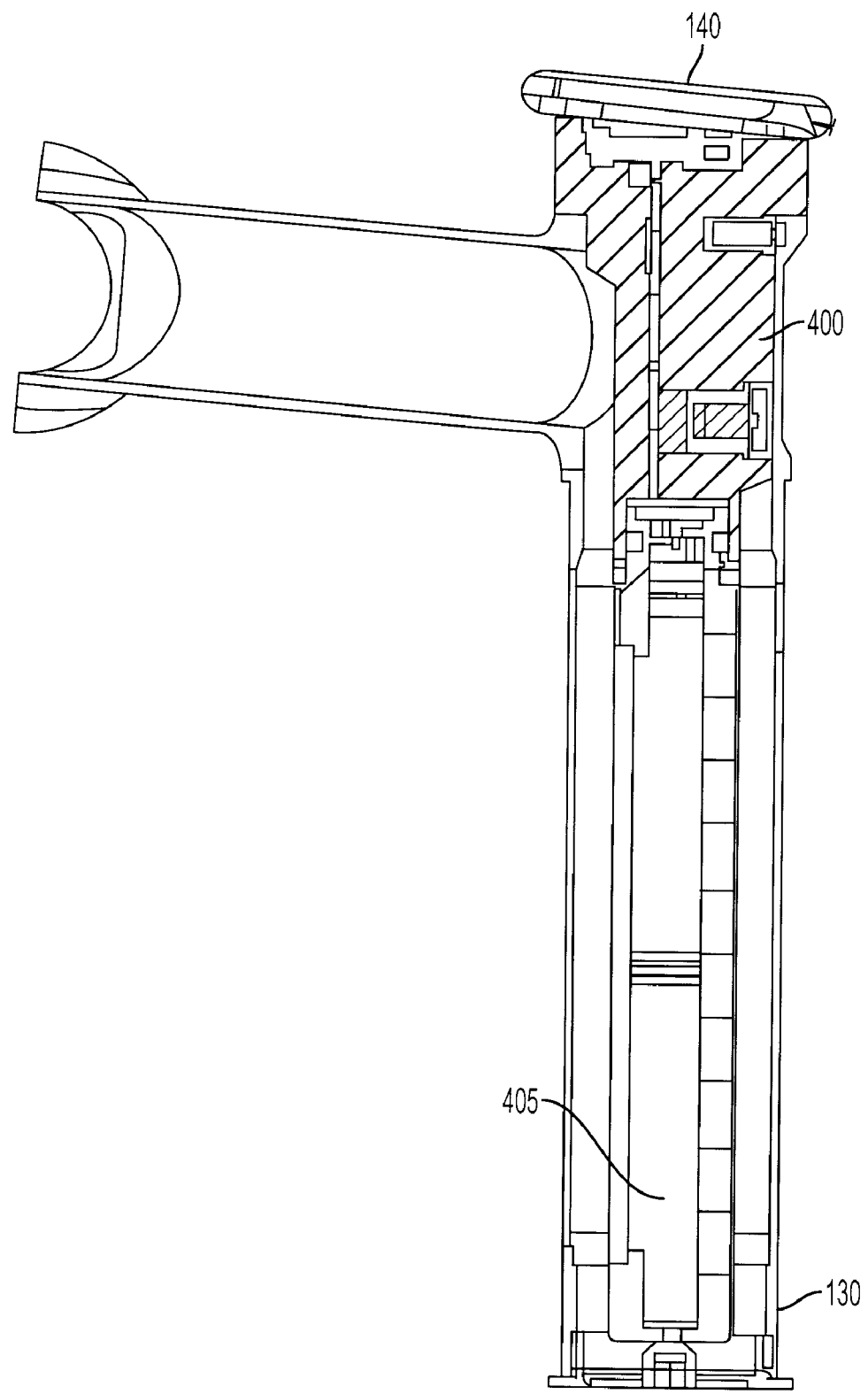
FIG. 7 illustrates a sectional view of the steering tube head assembly in accordance with the exemplary embodiment of FIG. 1.
Figure 8:
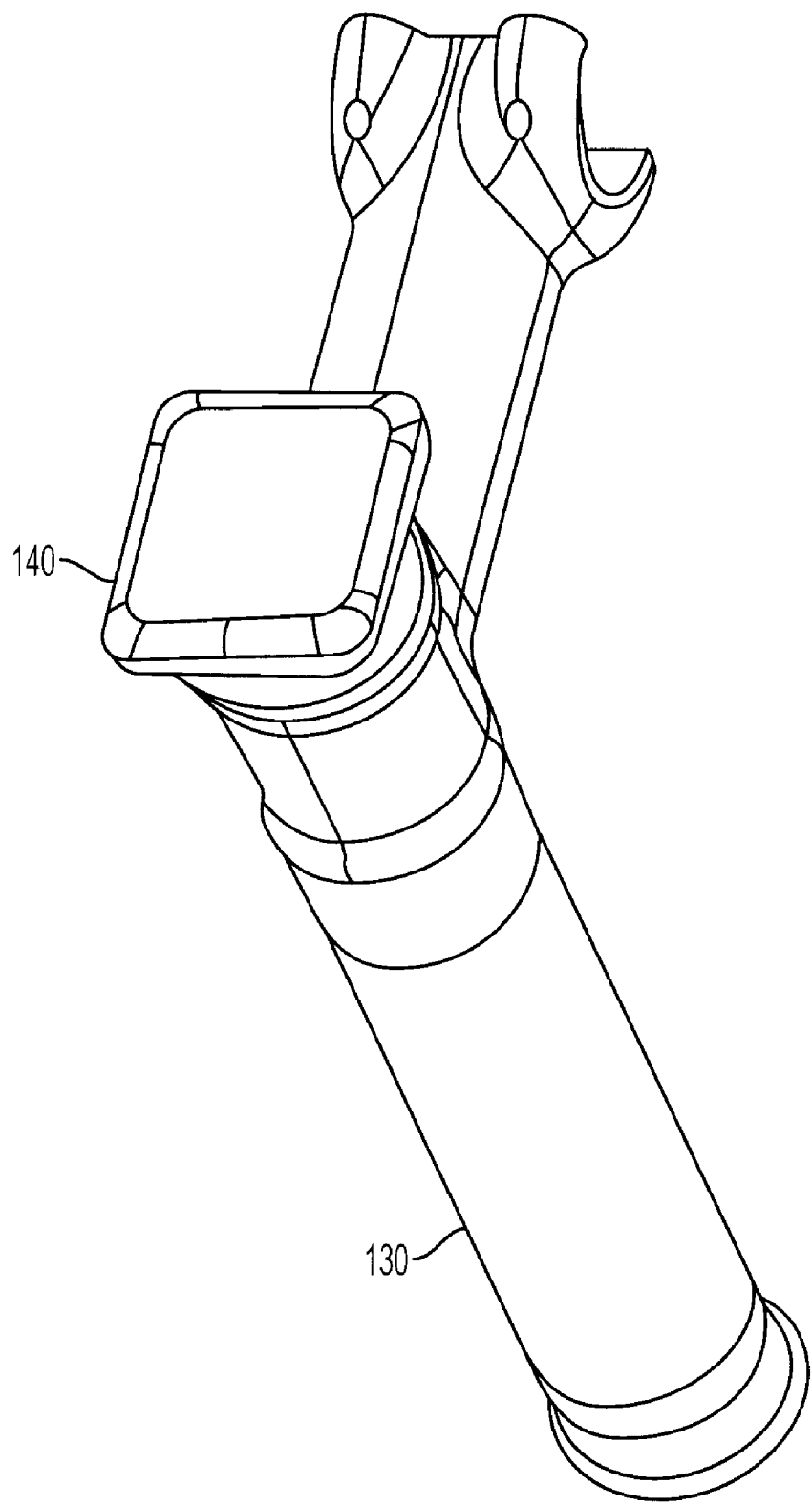
FIG. 8 illustrates an isometric view of the steering tube head assembly of FIG. 7.
Figure 9:
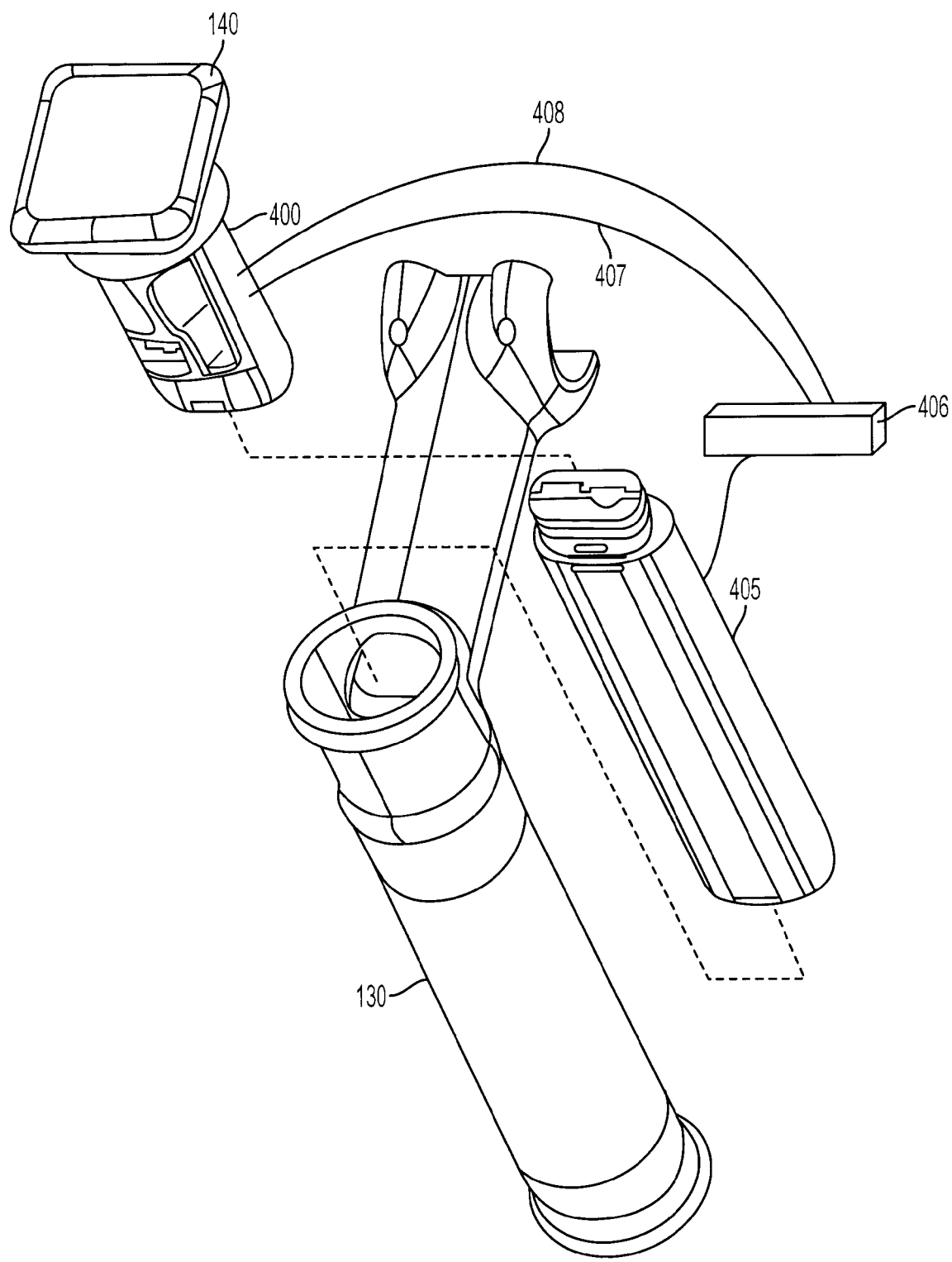
FIG. 9 illustrates an exploded isometric view of the steering tube head assembly of FIG. 8.

In the exemplary embodiment, the control system 190 includes a main controller 400 and battery 405 that are sized to fit in the head tube 130 as shown in FIGS. 7-9. A display 140 is coupled to the main controller 400 and forms a cover over the head tube 130 to prevent water, dust and debris from coming into contact with the main controller 400 and battery 405. In the exemplary embodiment, the display 140 is a liquid crystal display (LCD) that is a 1.5" color display with resolution of 176×132 pixels. However, it will be appreciated that other display sizes and higher resolutions may be employed as desired. In an embodiment, the fonts displayed on the display 140 are sized to fit 17 columns of text by 16 rows, however, a different number of columns and rows may be employed depending on display size and resolution. As will be discussed in more detail below with respect to the graphical user interface, the display may also illustrate graphics to aid the rider in interacting with the control system both before, and during operation. Alternatively, the display 140 may also be, but is not limited to an organic light-emitting diode (OLED), a light emitting polymer, an organic electroluminescence (OEL), or any other display suitable for the purposes disclosed herein.

Figure 11:
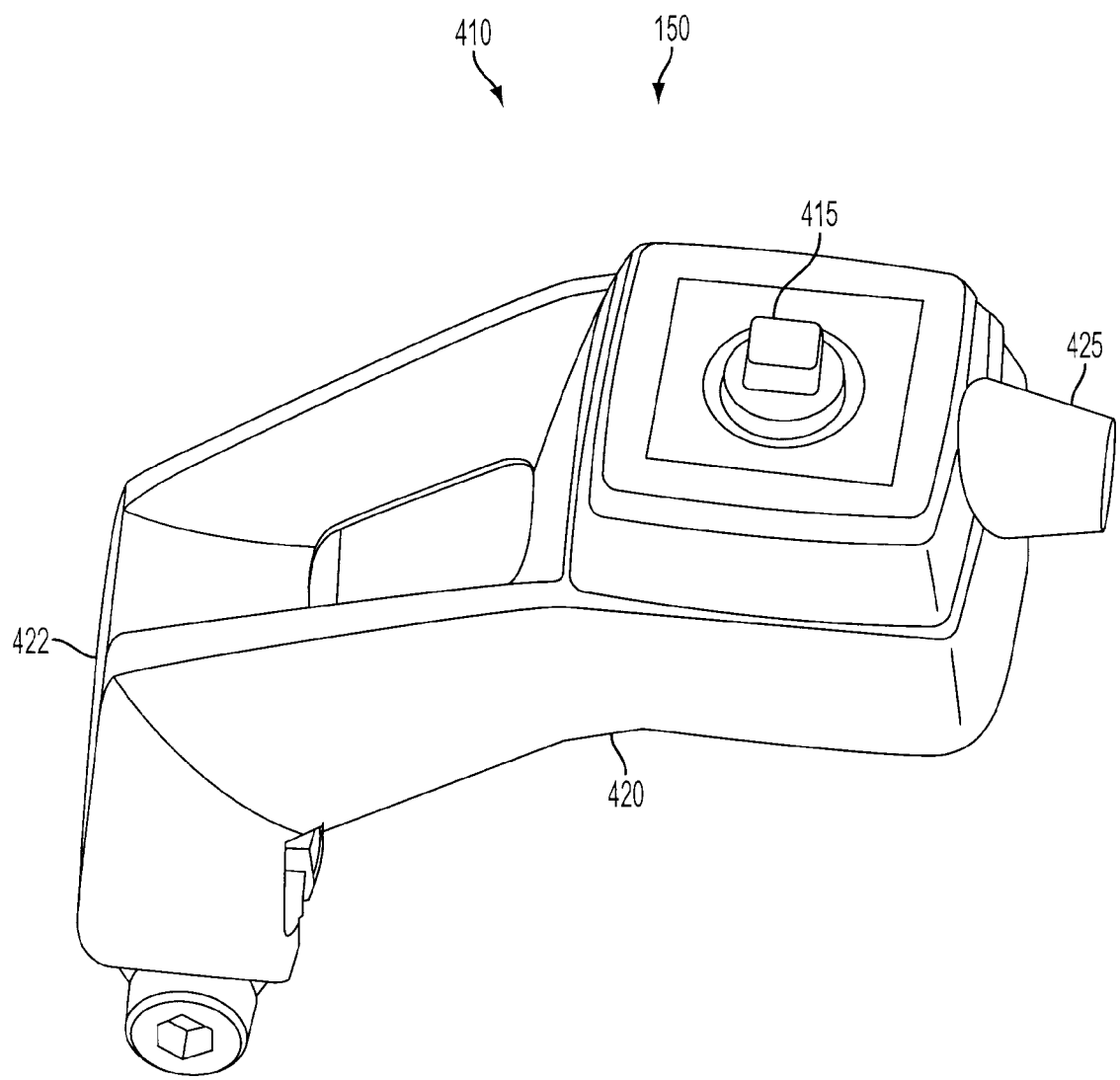
FIG. 11 illustrates an isometric view of the user interface of FIG. 10.
Figure 12:
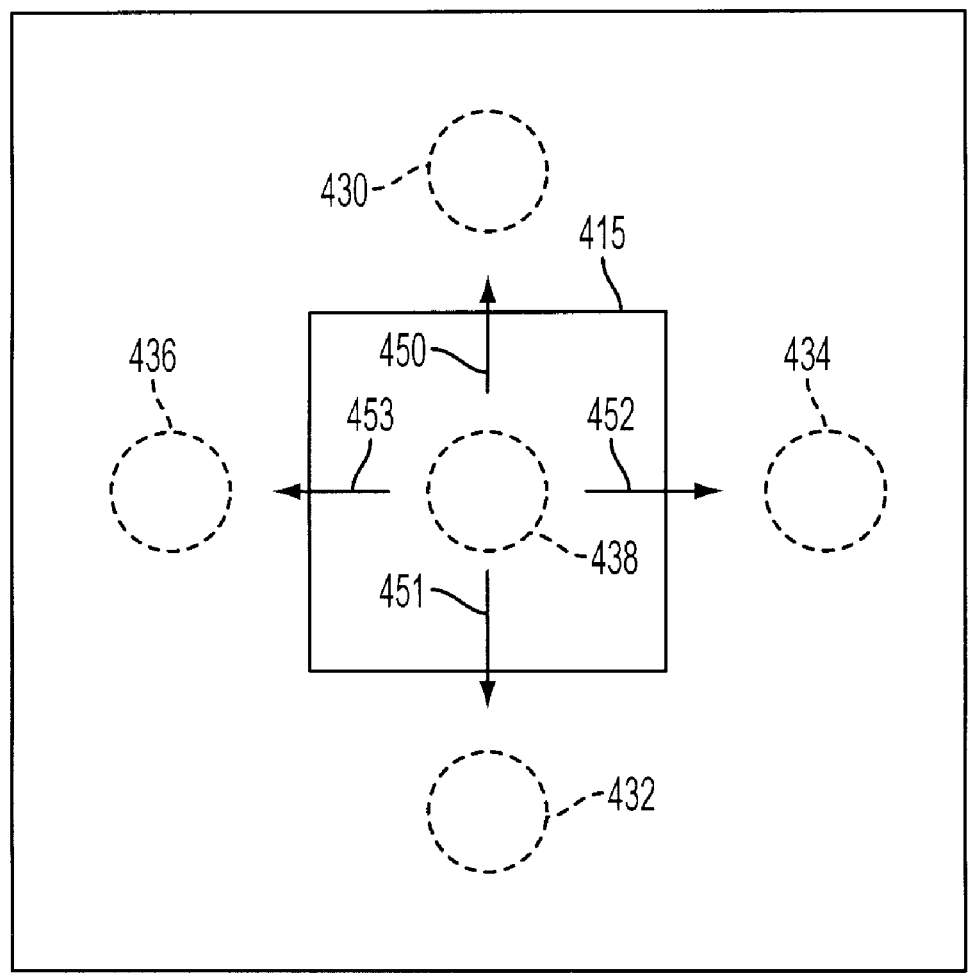
FIG. 12 illustrates a plan view of the user interface level of FIG. 11.

The controller 400 is electrically connected to a user interface 150 on the handle bar 145. Referring now to FIGS. 10-11, in the exemplary embodiment, the user interface 150 is in the form of a lever interface 410. The lever interface 410 includes a lever 415 mounted to a frame 420. The frame 420 includes a clamp portion 422 that allows the lever interface 410 to be fixedly attached to the handlebar 145. A feed-through 425 in the side of frame 420 provides an entry point for cable 428 that provides a pathway for signals between the main controller 400 and the user interface 150. In this embodiment, the lever 415 may be articulated in three axes and has five electrical contacts that may be actuated to provide a signal to the main controller 400. As shown in FIG. 12, four of the contacts have actuation directions in the same plane, forward 430, backward 432, right 434, and left 436. The fifth or center contact 438 is arranged to be actuated in a direction perpendicular to the other contact actuation directions (for example, by pressing down). In one embodiment, the lever 415 is positioned adjacent to a handbrake 440 and gear selector 445 to allow the rider to manipulate the lever interface 410 with a thumb.

Figure 13A:
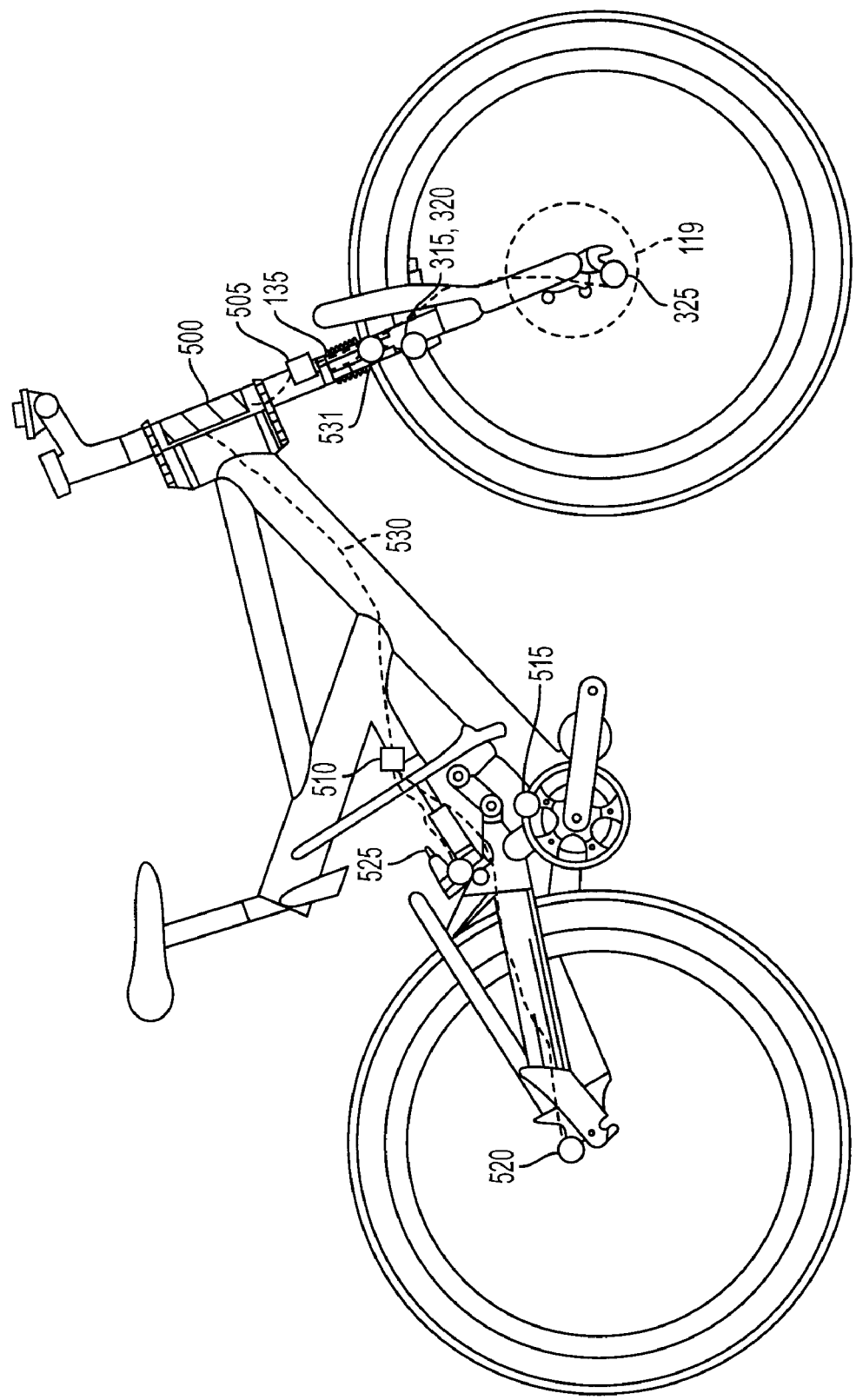
FIG. 13A illustrates a schematic representation of an exemplary embodiment of a distributed control system.
Figure 13C:
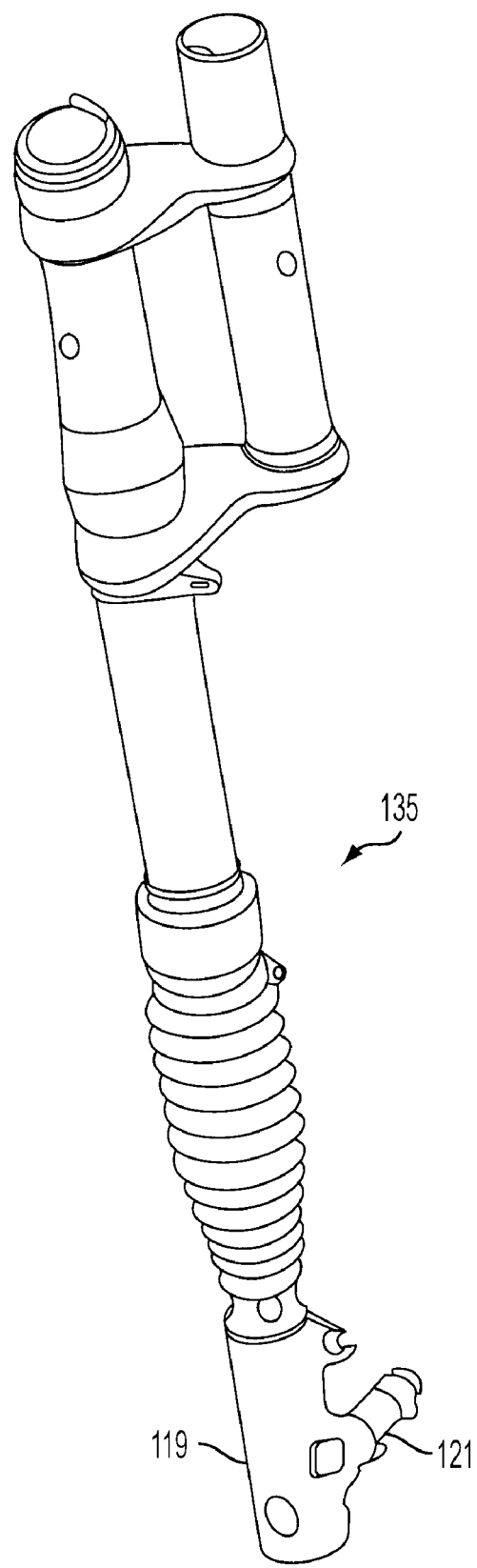
FIG. 13C illustrates a suspension system having the spindle of FIG. 13B.

In an alternate embodiment, the control system 190 is a distributed control system 500 as shown in FIG. 13A. In this embodiment, a plurality of sensors, including optical encoder 315, Hall effect sensor 320, accelerometer 325, for example, are coupled to one or more microcontrollers 505, 510. The microcontrollers 505, 510, such as Model AT90USB646 manufactured by Atmel Corp. interface with the sensors 315, 320, 325 and control the flow of communications with the main controller 400. In this embodiment, the microcontrollers 505, 510 are arranged regionally on the bicycle 100 to minimize the number and length of wiring. For example, microcontroller 505 is position in or adjacent to the suspension system 135 and connected to the optical encoder 315, the Hall effect sensor 320 and the accelerometer 325. This allows the use of a single connector cable to the main controller 400 rather than three. In one embodiment, many if not all of the elements of the control system 190 are disposed within the tubing of the frame 105 of the bicycle 100 for both aesthetic and functional reasons.

Additional microcontrollers such as microcontroller 510 may be connected to additional sensors such as but not limited to crank speed sensors 515, gear selection sensor 520, rear suspension sensor 525, and wheel velocity sensor 531. This embodiment provides the advantage of minimizing the number of connectors needed on the main controller 400, allowing for a small and less expensive manufacturing cost. Additionally, the number of wires on the bicycle 100 is reduced, thereby alleviating manufacturing assembly issues and decreasing the number of feed through openings needed when wires enter and exit the frame 105. Additional advantages may take advantage of the processing capabilities of the microcontrollers 505. Certain processes, such as error checking or sensor calibration for example, may be executed by the microcontroller 505, 510 and off load these tasks from the main controller 400.

Figure 14:
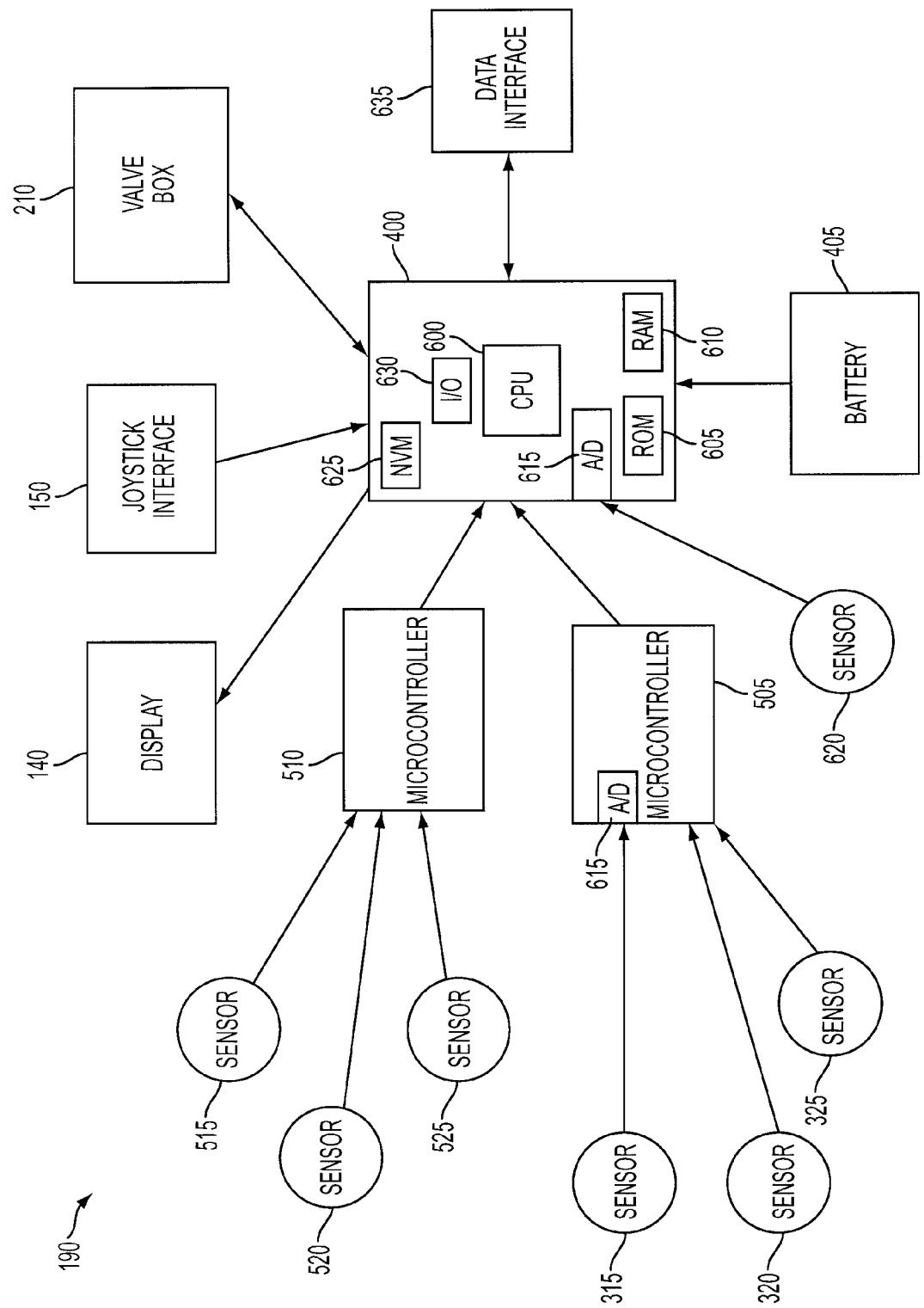
FIG. 14 illustrates a schematic representation of the distributed control system in accordance with the exemplary embodiment of FIG. 13A.

A block diagram of the control system 190 is illustrated in FIG. 14. The control system 190 includes a main controller 400. The main controller 400 is a suitable electronic device capable of accepting data and instructions, executing the instructions to process the data, and presenting the results. Main controller 400 may accept instructions through a user interface, or through other means such as but not limited to electronic data card, voice activation means, manually operable selection and control means, radiated wavelength and electronic or electrical transfer. Therefore, main controller 400 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a personal digital assistant (PDA) or a hybrid of any of the foregoing.

Main controller 400 is capable of converting the analog voltage or current level provided by sensors, such as sensor 620 for example, into a digital signal indicative of the a measured bicycle operation characteristic. Alternatively, sensor 620 may be configured to provide a digital signal to main controller 400, or an analog-to-digital (A/D) converter 615 maybe coupled between sensor 620 and main controller 400 to convert the analog signal provided by sensor 620 into a digital signal for processing by main controller 400. Main controller 400 uses the digital signals act as input to various processes for controlling the control system 190. The digital signals represent one or more system 190 data including but not limited to acceleration on the front wheel 110, position of the front suspension 135, the crank speed 515 and the like.

Main controller 400 is operably coupled with one or more components of system 190 by data transmission media 530 (FIG. 13A). Data transmission media 530 includes, but is not limited to, solid-core wiring, twisted pair wiring, coaxial cable, and fiber optic cable. Data transmission media 530 also includes, but is not limited to, wireless, radio and infrared signal transmission systems. In the embodiment shown in FIG. 13A, transmission media 530 couples main controller 400 to microcontrollers 505, 510 and sensors 315, 320, 325, 515, 520, 525. Main controller 400 is configured to provide operating signals to these components and to receive data from these components via data transmission media 530. Main controller 400 communicates over the data transmission media 530 using a well-known computer communications protocol such as Inter-Integrated Circuit (I2C), Serial Peripheral Interface (SPI), System Management Bus (SMBus), Transmission Control Protocol/Internet Protocol (TCP/IP), RS-232, ModBus, or any other communications protocol suitable for the purposes disclosed herein.

In general, main controller 400 accepts data from sensors, such as accelerometer sensor 325 for example, and devices such as motor control 310 for example. Main controller 400 is also given certain instructions from an executable instruction set for the purpose of comparing the data from sensor 325 to predetermined operational parameters such as a damping curve. Main controller 400 provides operating signals to motor control 310 that operates valve 300. Main controller 400 also accepts data from motor control 310, indicating, for example, whether the motor 305 or valve 300 is operating correctly. The main controller 400 compares the operational parameters to predetermined variances (for example, motor current, valve position) and if the predetermined variance is exceeded, generates a signal that may be used to indicate an alarm or message to the rider on display 140. Additionally, the signal may initiate other control methods that adapt the operation of the control system 190 such as changing the operational state of valve 300 to compensate for the out of variance operating parameter.

Main controller 400 includes a processor 600 coupled to a random access memory (RAM) device 610, a non-volatile memory (NVM) device 625, a read-only memory (ROM) device 605, one or more input/output (I/O) controllers 630, and a data interface device 635.

I/O controllers 630 are coupled to the display 140, user interface 150, motor controller 310, and microcontrollers 505, 510 for providing digital data between the aforementioned devices. I/O controllers 258 may also be coupled to one or more analog-to-digital (A/D) converters 615, which receive analog data signals from sensors.

Data interface device 635 provides for communication between main controller 400 and an external device, such as a computer, a laptop or a computer network for example, in a data communications protocol, such as but not limited to USB (universal serial bus) or JTAG (joint test action group) for example, supported by the external device. ROM device 605 stores an application code, e.g., main functionality firmware, including initializing parameters, and boot code, for processor 600. Application code also includes program instructions as shown in FIGS. 15-24 for causing processor 600 to execute any operation control methods, including starting and stopping operation, changing operational states of valve 300, monitoring predetermined operating parameters such as measurements by sensors 315, 320, 325, and generation of display messages.

NVM device 625 is any form of non-volatile memory such as an EPROM (Erasable Programmable Read Only Memory) chip, a flash memory chip, a disk drive, or the like. Stored in NVM device 625 are various operational parameters for the application code. The various operational parameters can be input to NVM device 625 either locally, using user interface 150 or remotely via the data interface 635. It will be recognized that application code can be stored in NVM device 625 rather than ROM device 605.

Battery 405 may include a microcontroller 406 that controls the flow of electrical power through one or more cables 408 to main controller 400 for operating the control system 190 as described above. Microcontroller 406 may further include one or more data lines 407 that allow microcontroller 406 to transmit data, such as battery temperature and remaining electrical power capacity for example, to the main controller 400.

Main controller 400 includes operation control methods embodied in application code shown in FIGS. 15-24. These methods are embodied in computer instructions written to be executed by processor 600, typically in the form of software. The software can be encoded in any language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Figure 15:
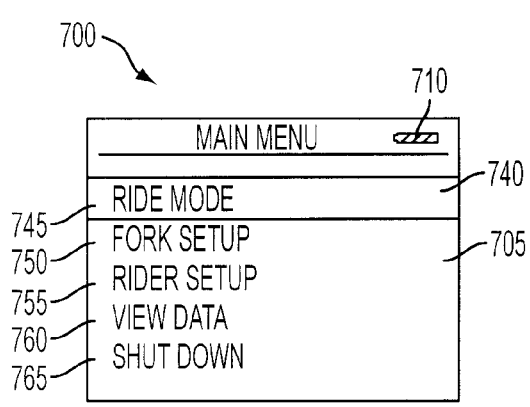
FIG. 15 illustrates an exemplary embodiment of a menu selection display for an exemplary bicycle control system.

Referring now to FIGS. 15-24, the graphical user interface 700 (GUI) generated by processor 600 and displayed on display 140 is shown. The GUI 700 generally has one of four modes of display. In a first mode, the GUI 700 may be a main menu selection entry 705 as shown in FIG. 15. The second mode is a "ride mode", such as that shown in FIG. 16A. In ride mode, the GUI uses a combination of graphical 715 and textual 720 elements to assist the rider in quickly interacting with the control system 190 during operation.

The third mode of display illustrated in FIGS. 17-22 is also a combination of a graphical element, such as indicator bar 725 for example, and a textual element. The third mode of display allows the rider to change operating characteristics for various components, such as suspension system 135. The fourth mode of display, illustrated in FIG. 23 displays a graphical representation 730, such as a histogram for example, of data collected by the control system 190 during operation. During each of the modes of operation, a battery indicator 710 is displayed in the corner of the display.

When the control system 190 is activated, by toggling the user interface 150 for example, the GUI 700 displays the main menu selection 705. In this display, the rider uses the user interface 150 to move the indicator 740 between the various menu selections. In the exemplary embodiment, the indicator is a different color from the background of GUI 700 and the textual menu entry selections "Ride Mode" 745, "Fork Setup" 750, "Rider Setup" 755, "View Data" 760, and "Shut Down" 765 to highlight the selected menu entry. To select a particular menu item, the rider uses the interface 150 by pushing the lever 415 in the direction indicated by arrows 450, 451, 452, 453 into contact with one of the contacts 430, 432, 434, 436, 438. For example, in the main menu 705, if the lever is pushed in the direction of arrow 451 and into contact with backward contact 432, the indicator 740 would move from "ride mode" 745 to "fork setup" 750. To select, a menu entry, the rider presses down on the lever 415 to contact the center contact 438. Once the center contact 438 is actuated, a signal is transmitted by the lever interface 410 via the control system 190 that changes the GUI 700 to reflect the rider's selection.

The first selection on main menu 705 is labeled "ride mode" 745. Selection of ride mode 745 results in the GUI 700 changing display 140 to that illustrated in FIG. 16A. Ride mode GUI 745 includes both graphical elements 715 that are displayed to look similar to a button, and textual elements 720 that provide a visual feedback as to the rider indicating what feature the selection will activate. In the exemplary embodiment, the ride mode GUI 745 will change the operating characteristics of the bicycle 100 and the suspension system 135 in particular. In certain types of bicycling, such as mountain biking for example, the rider may encounter different types of terrain either within the same outing, or on different outings. Since it would be inconvenient to have multiple bicycles to manage different terrains, it would be advantageous to have the control system 190 adapt the operation of the bicycle for different types of terrains.

Figure 16A:
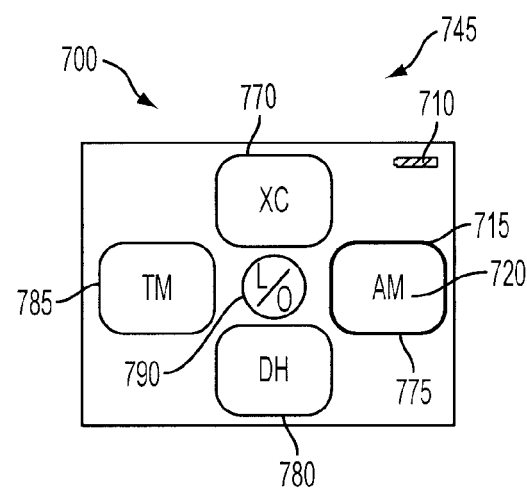
FIG. 16A illustrates a "Ride Mode" selection display for the bicycle control system in accordance with the exemplary embodiment of FIG. 15.
Figure 16C:
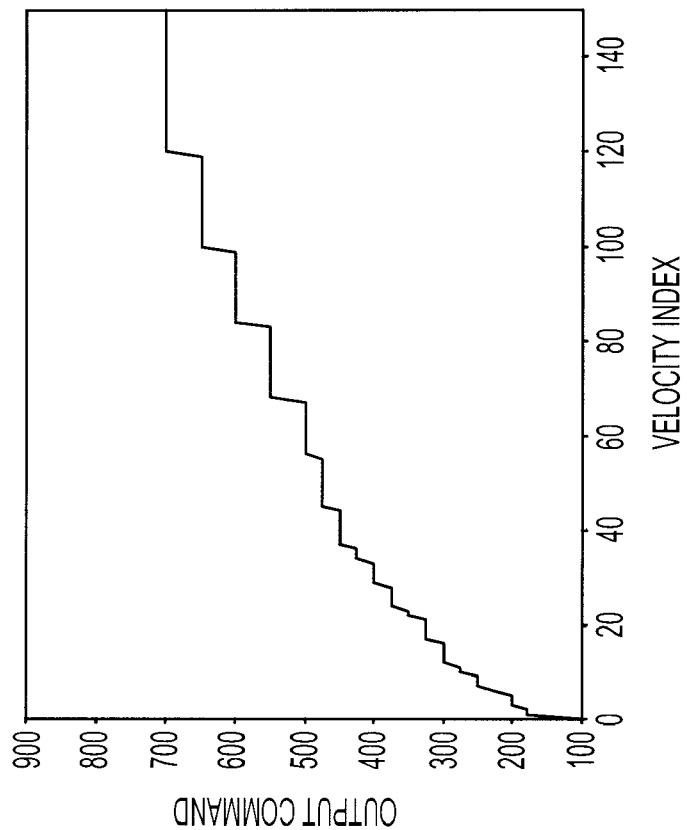
FIGS. 16B and 16C illustrate an exemplary damping curve and command curve used with the control system of FIG. 15.
Figure 16B:
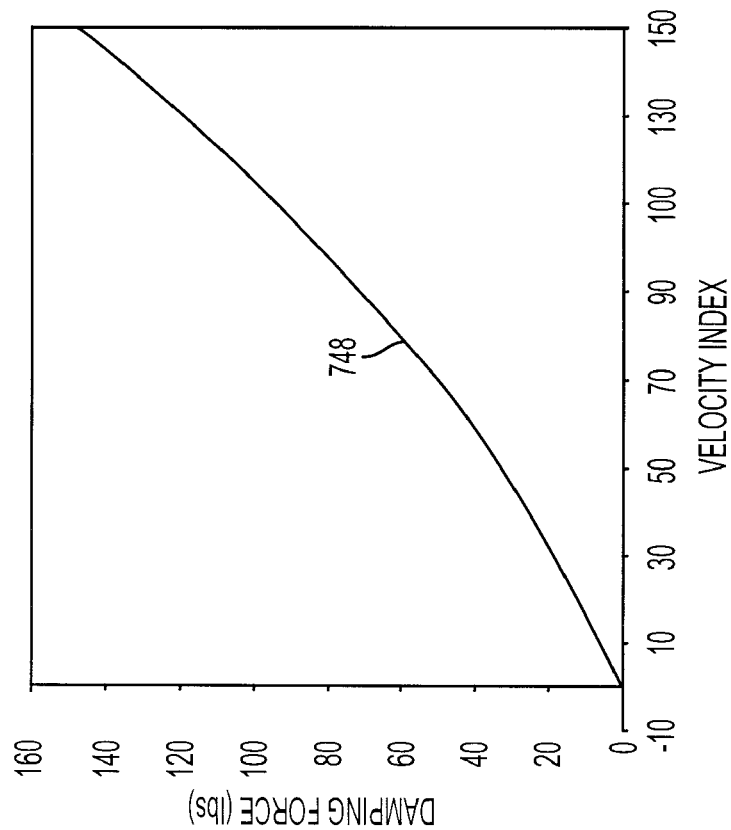

In the exemplary embodiment illustrated in FIG. 16A, the ride mode GUI 745 has five selections, "XC" 770 (cross country), "AM" 775 (all mountain), "DH" 780 (down hill), "TM" 785 (travel management) and "L/O" 790 (lockout). Each of these selections will change the operating characteristics of the suspension system 135 by changing the damping curve used by the control system 190 to provide a damping performance that is desirable for the expected terrain. An exemplary damping curve 748 is illustrated in FIG. 16B. The damping curves are used by the control system 190 to determine what orifice size is required for valve 300 during conditions executed during operation. For example, by using the damping curve 748, the damping force for a particular velocity is known. From this, the signal to be transmitted to the control the size of valve 400 may be determined from the command curve illustrated in FIG. 16C. It should be appreciated that in the exemplary embodiment, the ride mode selections 770, 775, 780, 785, 790 are arranged on the display 140 in the same location as the contacts 430, 432, 434, 436, 438 relative to the lever 415 on the lever interface 410. This provides an advantage in that the rider does not have to look at the display 140 to confirm their mode of operation, but may simply move the lever 415 to the desired mode. Thus the rider can avoid having to take their eyes off the trail.

It should be appreciated that while the user interface 150 is illustrated and described as being on the right side of the handle bar 145, it may be mounted on either side as desired by the rider. In an embodiment where the user interface 150 may be mounted on either side, the setup process may include a selection for indicating which side of the handle bar 145 the joystick 410 is located. When the user interface 150 is relocated, the contacts 430, 432, 434, 436 are changed to correspond to the graphical user interface 700. For example, when the joystick 410 is on the left hand side, contact 430 is considered "up," and used as such (menu selection, and XC selection during ride mode). When the joystick 410 is on the right side of the handle bar 145, 430 is now considered "down." In menu selections, 430 will be used to move the highlighter/indicator down. It will also be used to select DH during ride mode.

The XC 770 selection refers to cross-country style of bicycle riding which is the most common form of mountain biking. This type of terrain generally involves riding point-to-point or in a loop including climbs and descents on a variety of terrain.

The AM 775 selection refers to an all-mountain style of terrain which is a general purpose setting to handle almost everything a rider will encounter on a day of riding. Typically, the all mountain setting has about 4 to 6 inches of travel in the suspension system 135. The AM 775 damping curve is intended to allow the ride to climb hills efficiently while allowing more damping to absorb larger impacts than the XC 770

The DH 780 selection refers to a form of riding that consists mostly of riding down steep inclines. The DH 780 damping curve provides for a smaller amount of damping from the suspension system 135 allowing the suspension to be freer to move, sometimes referred to as "plush". This allows the suspension system 135 to provide additional stability for the rider when encountering multiple fast impacts. The one exception to this is when the rider encounters a large impact, whereupon the damping is increased proportionally with the position of the fork to prevent the suspension system from bottoming out. Typically, the downhill setting has about 7 to 10 inches of travel in the suspension 135.

The TM 785 selection allows the rider to change the amount of travel of the piston 260 allowed in the suspension system 135 The L/O 790 setting "locks-out" the suspension system 135 so only minimal suspension travel is used and the damping is effectively reduced to zero. The L/O 790 mode is desirable when the rider encounters smooth terrain, such as a paved street or hard packed dirt for example.

Figure 17:
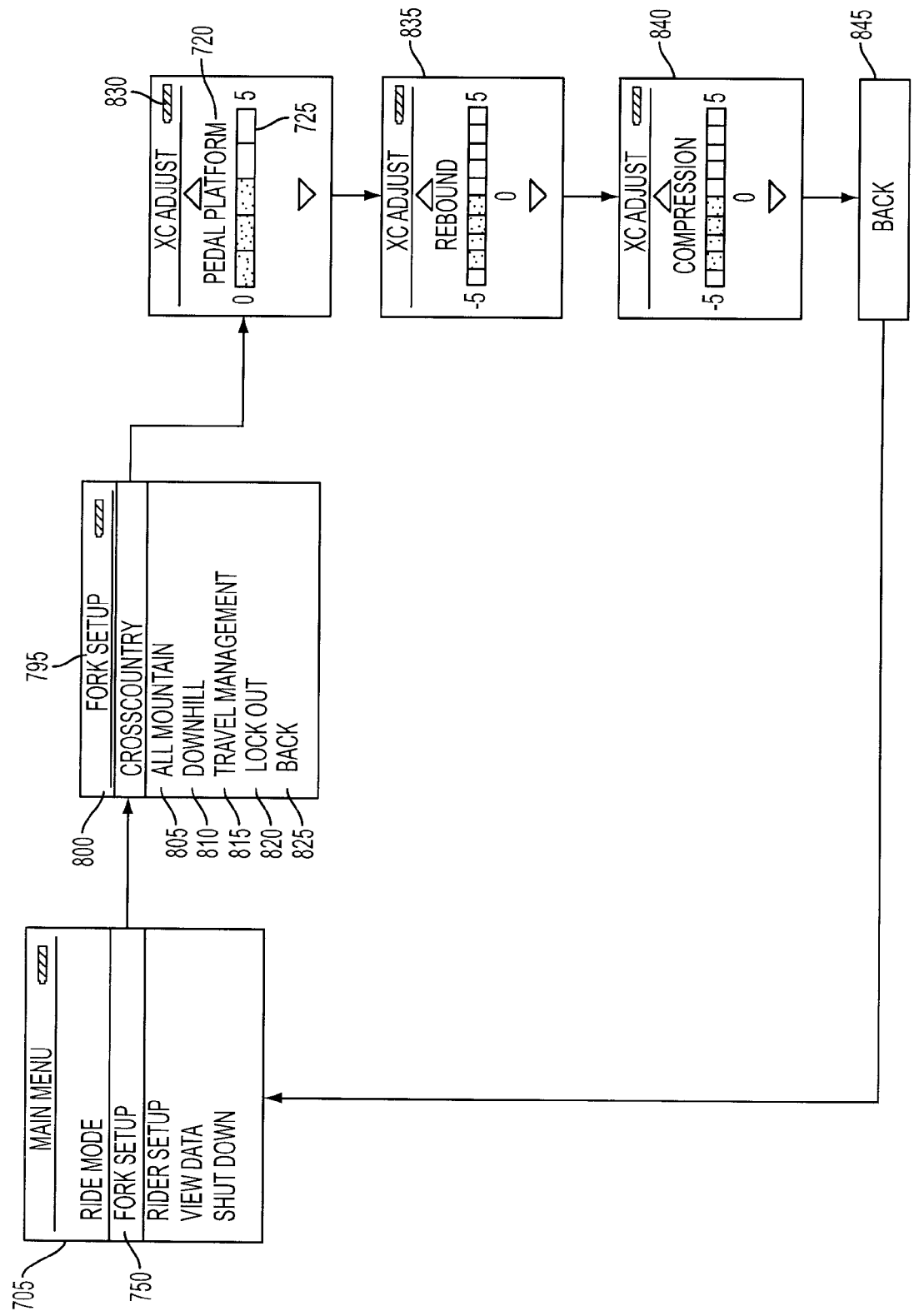
FIGS. 17-19 illustrate the setup display menus for adjusting the respective ride mode parameters for the cross-country, all-mountain, and down-hill ride modes.

If the rider selects "FORK SETUP" 750 from the main menu 705, the rider is presented with the series of GUI menu displays illustrated in FIG. 17. The fork setup 750 selection allows the rider to change parameters associated with each of the ride modes 745 to meet their desired performance. The first screen displayed is a menu selection 795 that displays each of the ride mode options. In the exemplary embodiment, the menu selections include "CROSSCOUNTRY" 800, "ALL MOUNTAIN" 805, "DOWNHILL" 810, "TRAVEL MANAGEMENT" 815, "LOCK OUT" 820, and "BACK" 825. Similar to above, the rider used the user interface lever 415 to navigate to the desired selection and made a selection by actuating the center contact 438.

In the embodiment illustrated in FIG. 17, the crosscountry 800 menu entry is selected. This results in a series of menu displays 830, 835, 840 being presented to the rider in turn. Each of the displays 830, 835, 840 provides the rider the opportunity to adjust the setting of a parameter associated with the selected ride mode. The first display 830 allows the rider to change the "PEDAL PLATFORM" parameter. Pedal platform refers to the amount of stiffness in the suspension system that results in "pedal bobbing" which is the amount of efficiency loss during pedaling due to the suspension compression and rebounding that results from the rider's pedaling force. An indicator bar 725 graphically shows the rider the current setting. To change the parameter setting, the rider uses the user interface lever 415 and actuates the right contact 434 to increase the setting or left contact 436 to decrease the setting. In the exemplary embodiment, the setting may be changed from a level of 0 to 5. Once the desired setting is achieved, the rider actuates the contact 432 to change to the next display.

The next display under the cross-country selection 800 is the rebound display 835. Similar to above, the rider changes the parameter setting, −5 to 5 for example, and actuates the contact 432. The rebound parameter adjusts the amount of damping provided by the suspension system 135 during the rebound stroke of the suspension. After adjusting the rebound setting, the display changes to a compression display 840. Similar to above, the rider changes the setting, −5 to 5 for example, and actuates the contact 432. If the rider needs to go back to previous setting, this is accomplished by actuating the forward contact 430. The last display in the "BACK" display 845, which when selected returns the rider to main menu 705.

Figure 18:
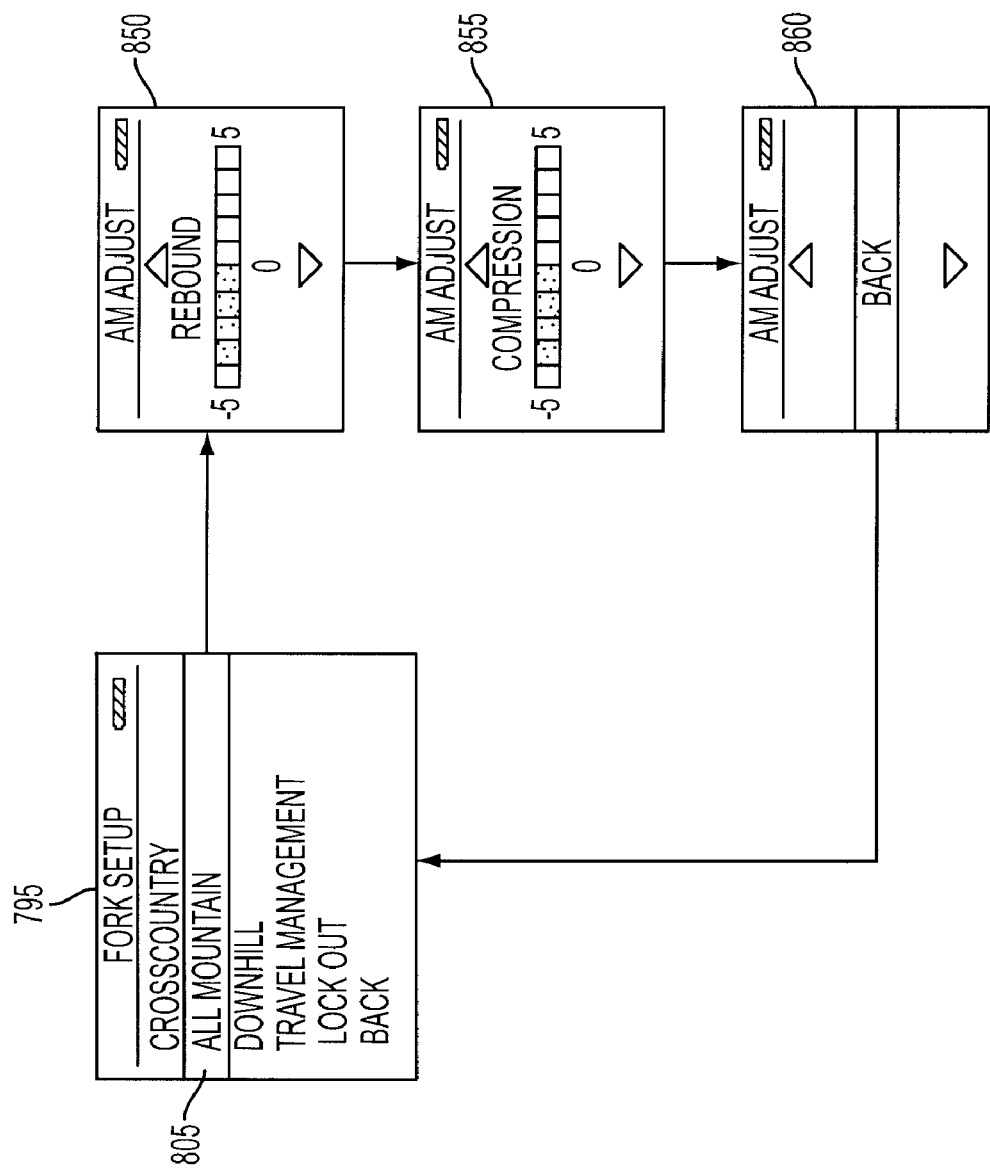

If the rider had selected all mountain menu entry 805 from the fork setup menu selection 795, the rider is presented with three displays, rebound display 850, compression display 855 and back display 860 as shown in FIG. 18. The rider adjusts these parameters and navigates through the displays in the same manner as described above.

Figure 19:
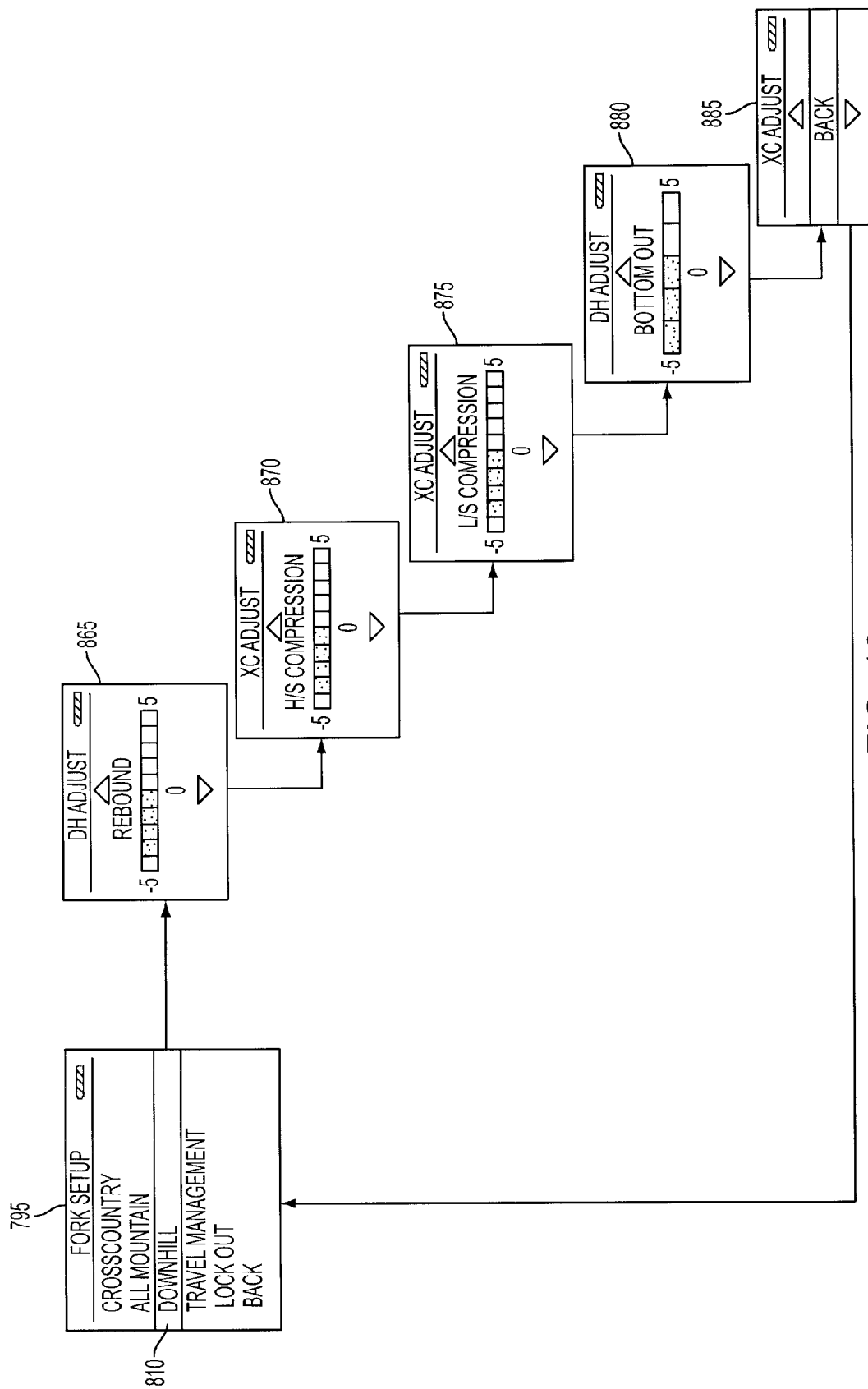

The selection of the downhill menu entry 810 from the fork setup menu selection 795 results in the presentation of five menu displays as shown in FIG. 19, rebound display 865, high-speed compression display 870, low-speed compression display 875, bottom out display 880, and back display 885. The rider adjusts these parameters and navigates through the displays in the same manner as described above.

Figure 20:
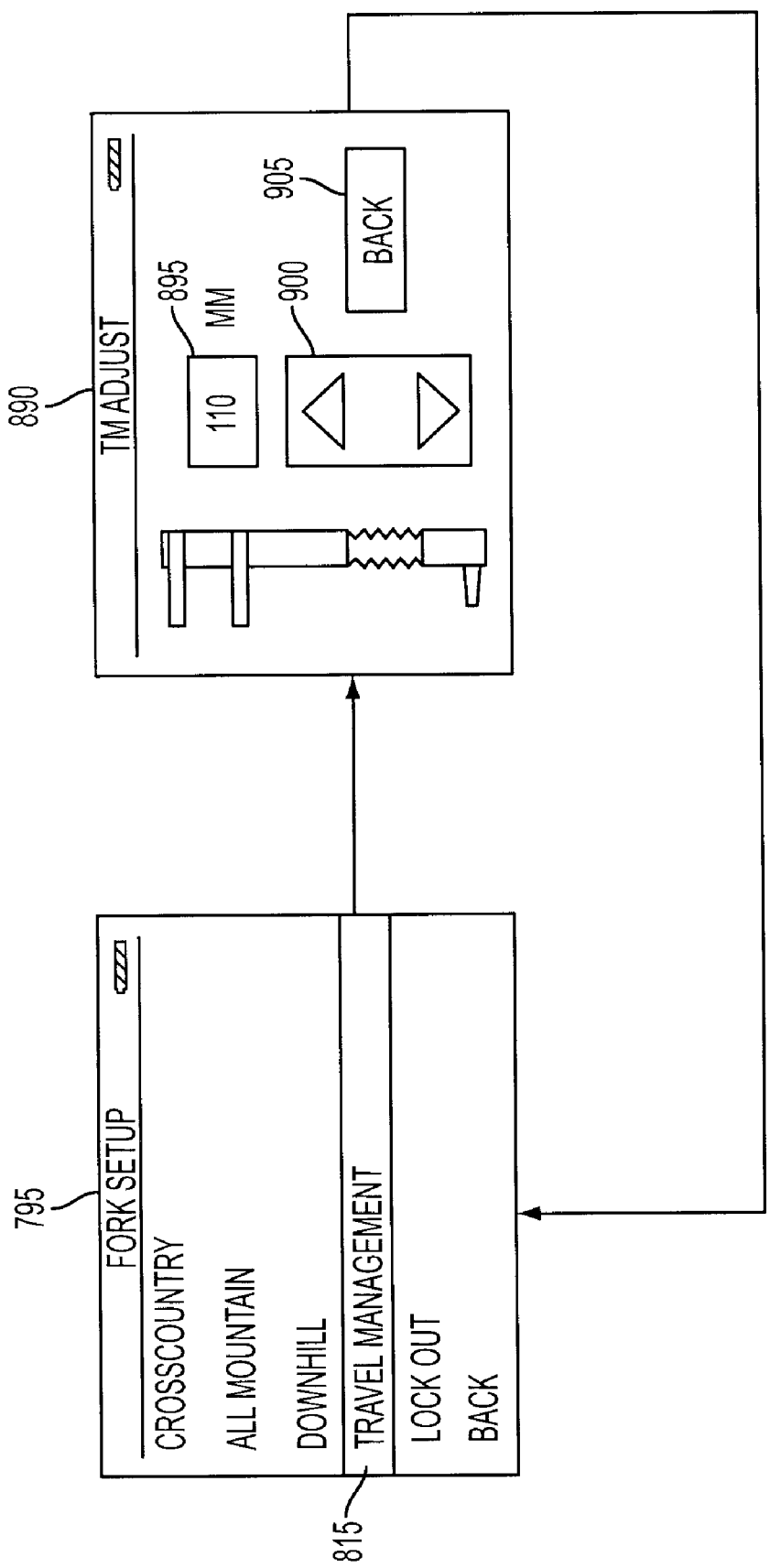
FIG. 20 illustrates the setup display menu for travel management of the suspension system.

If the rider chose the travel management menu entry 815 from the fork setup menu selection 795, the TM Adjust display 890 is presented as shown in FIG. 20. The TM Adjust display 890 displays the current amount of travel in a text box 895. The rider actuates the forward 430 and backward 432 contacts with the lever 415 to change the amount of travel in the suspension system 135. A graphical indicator 900 provides a visual indication to the rider on how to increase and decrease the travel parameter. The back indicator 905 is selected by actuating the right contact 434. Upon selection of the back indicator 905, the rider is returned to the fork setup menu 795.

Figure 21:
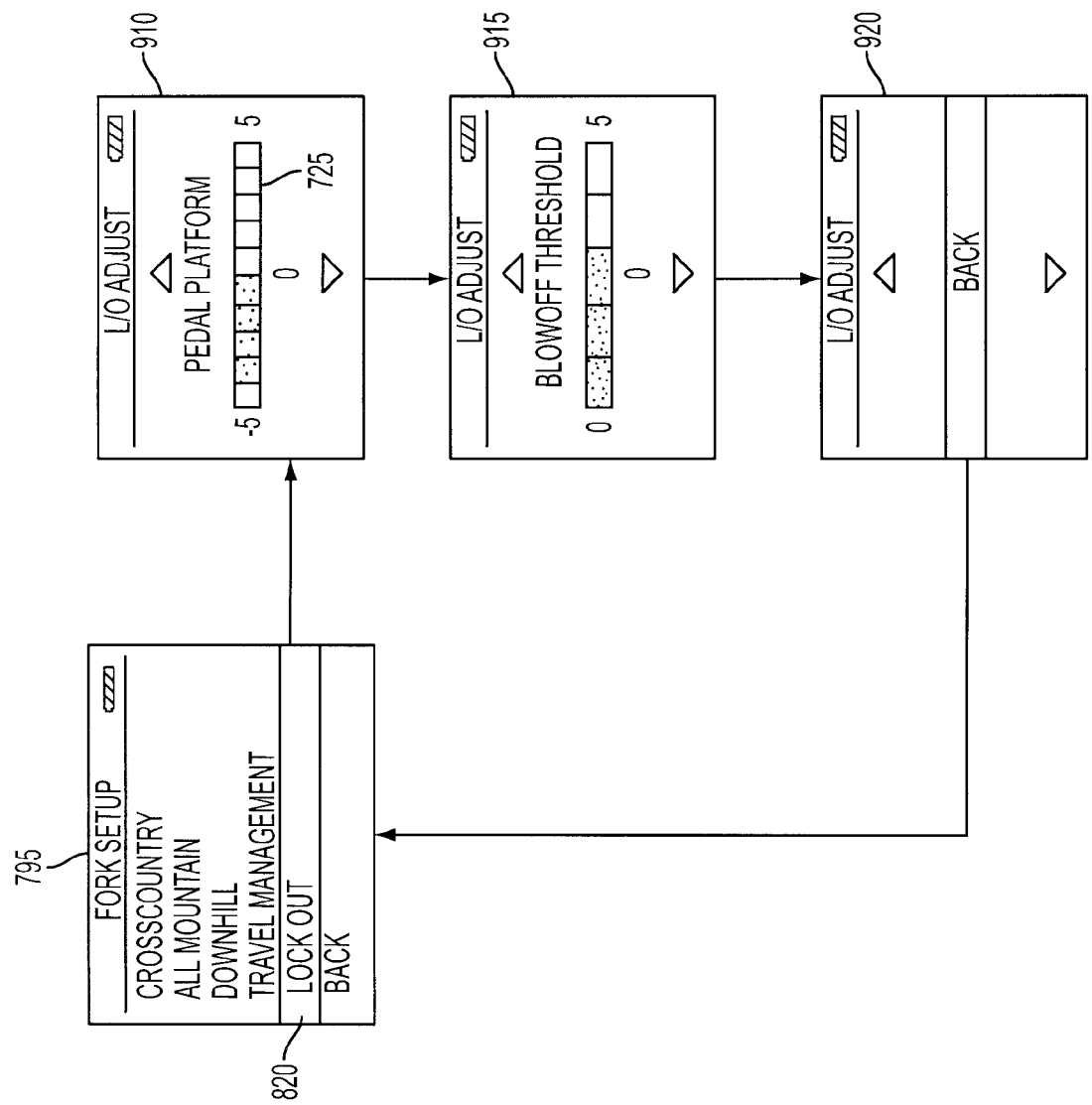
FIG. 21 illustrates the setup display menus for adjusting parameters for a lock-out mode of operation.

Selection of the lock out menu entry 820 from fork setup menu selection 795 results in the presentation of three displays, pedal platform display 910, blowoff threshold 915, and back display 920 as shown in FIG. 21. The rider adjusts these parameters and navigates through the displays in the same manner as described above. The blowoff threshold 915 allows the rider to change the impact threshold level where the lockout mechanism disengages. Then operating in lockout mode 790, the suspension system 190 provides very little damping. The blowoff threshold provides for a level of impact whereupon the suspension system re-engages to provide damping in the event the rider experiences an unexpected obstacle (such as a pothole for example).

Figure 22:
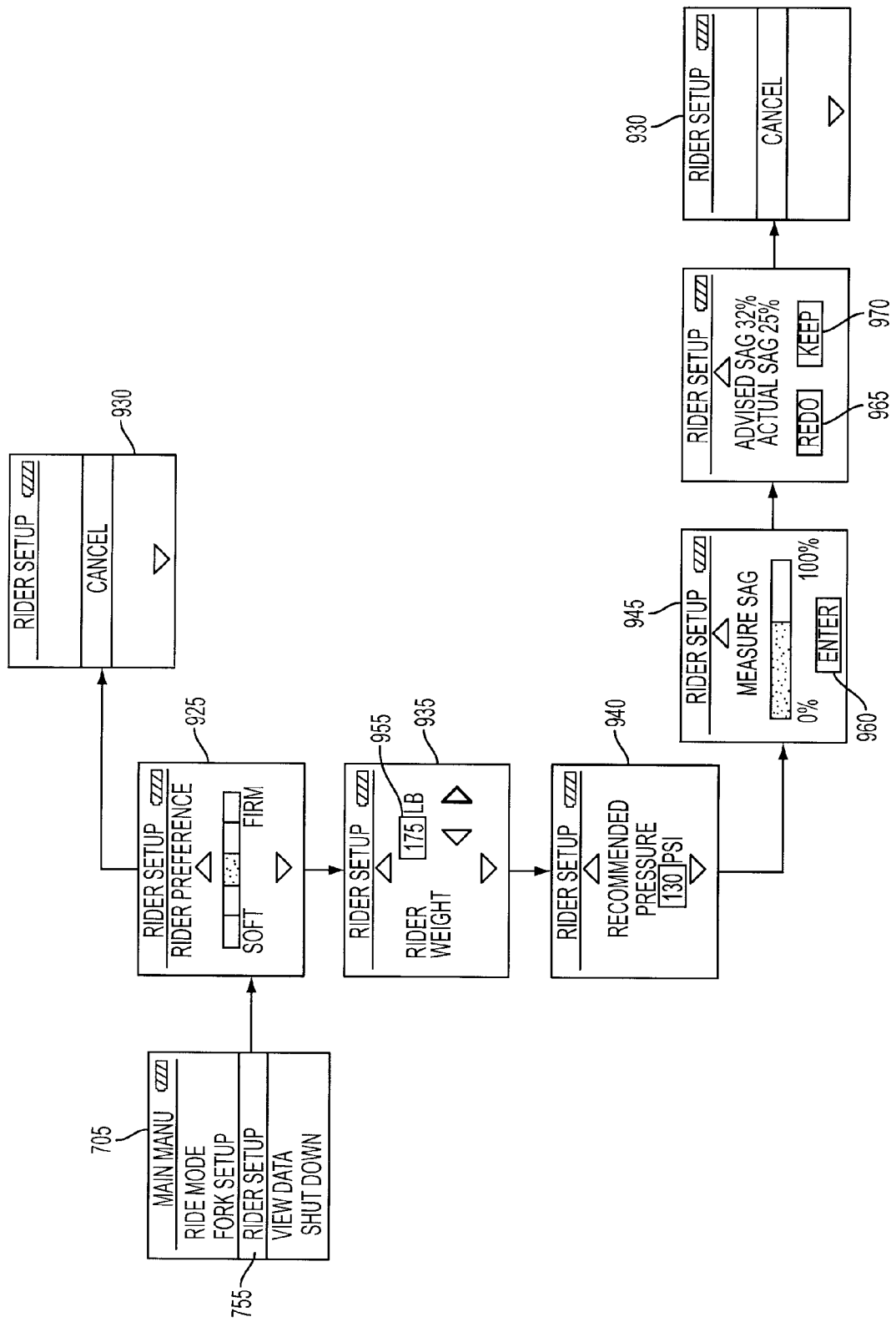
FIG. 22 illustrates the setup display menus for adjusting parameters particular to characteristics of the rider.

Referring to FIG. 22, the rider may further adjust the operation of the bicycle 100 by entering personal characteristics and preferences through the selection of menu entry 755 from the main menu 705. This results in the display of rider preference display 925. In this display 925, the rider may change a firmness parameter along a progressive scale to reflect their personal preference for a suspension. If the rider softens the suspension by moving the indicator to the left, less damping will be achieved. If the rider moves the indicator to the right towards the "FIRM" text, the suspension system 135 will provide more damping. The movement of the parameter in the rider preference display 925 alters the default damping curve for any of the modes of operation by shifting the curve to provide more or less damping. If the rider only wants a change in the firmness parameter, the rider setup routine may be exited by actuating the forward contact 430 that then enters display 930 and an exit to the main menu 705.

From the rider preference display 925, if the rider actuates the contact 432, the display changes to rider weight display 935. By actuating the right 434 and left 436 contacts with the user interface lever 415, the rider can select and enter their body weight. The selected weight is displayed in text box 955. Once the riders weight is entered and the rider actuates the contact 432, the processor 600 executes instructions to calculate the recommended pressure in air piston 220. The rider may then adjust the air pressure in air piston 200, either decreasing or using a hand pump to increase to the desired pressure.

Upon actuating the contact 432, the processor 600 executes further instructions to measure the actual sag or deflection in the suspension system 135, through signals from optical encoder sensor 315 for example, due to the rider's weight. This static deflection or "sag" is displayed in terms of percentage on display 945. Once the enter button 960 is selected by the rider, the processor 600 executes instructions to determine the predicted amount of sag that would be expected if the rider entered the proper air pressure in the air piston 220. The advised sag and actual sag are presented to the rider in display 950. This display 950 provides the rider with the option of re-executing the rider setup process by selecting button 965 or if the rider finds the settings acceptable, selecting the keep button 970. After exiting the display 950, the rider enters display 930 that allows an exit to main menu 705.

Figure 23:
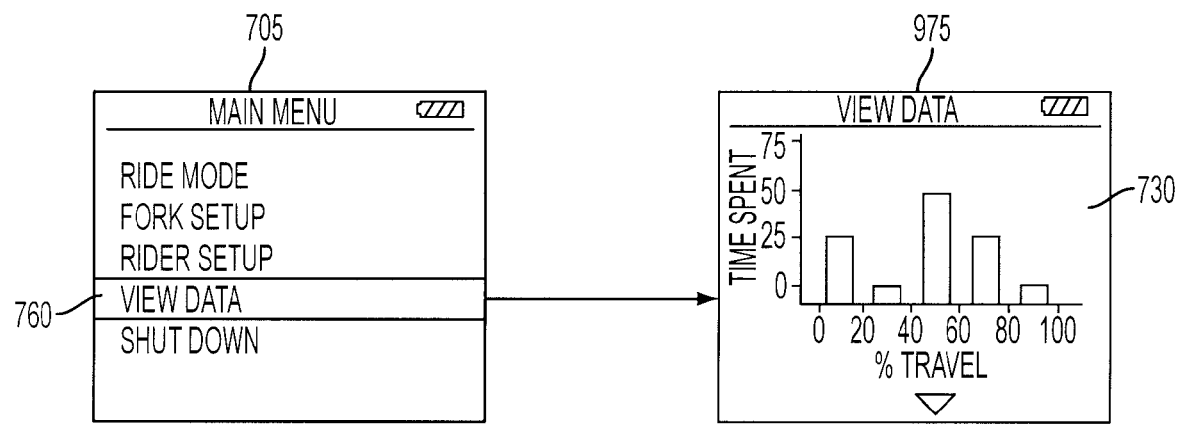
FIG. 23 illustrates the display for viewing histogram data collected during operation of the bicycle.

The rider may also choose to review data collected by control system 190 by selecting menu entry 760 from the main menu 705 as shown in FIG. 23. Upon selection of menu entry 760, the display changes to view data display 975 that presents a graph of parameters collected and stored by the control system 190. In the exemplary embodiment, the graph is a histogram 980 that represents the amount of time spent at various levels of travel in suspension system 135. The rider to determine if the suspension system 135 needs to be made firmer or softer to improve performance, for example, may use the histogram 980 to aid their analysis.

Figure 24:
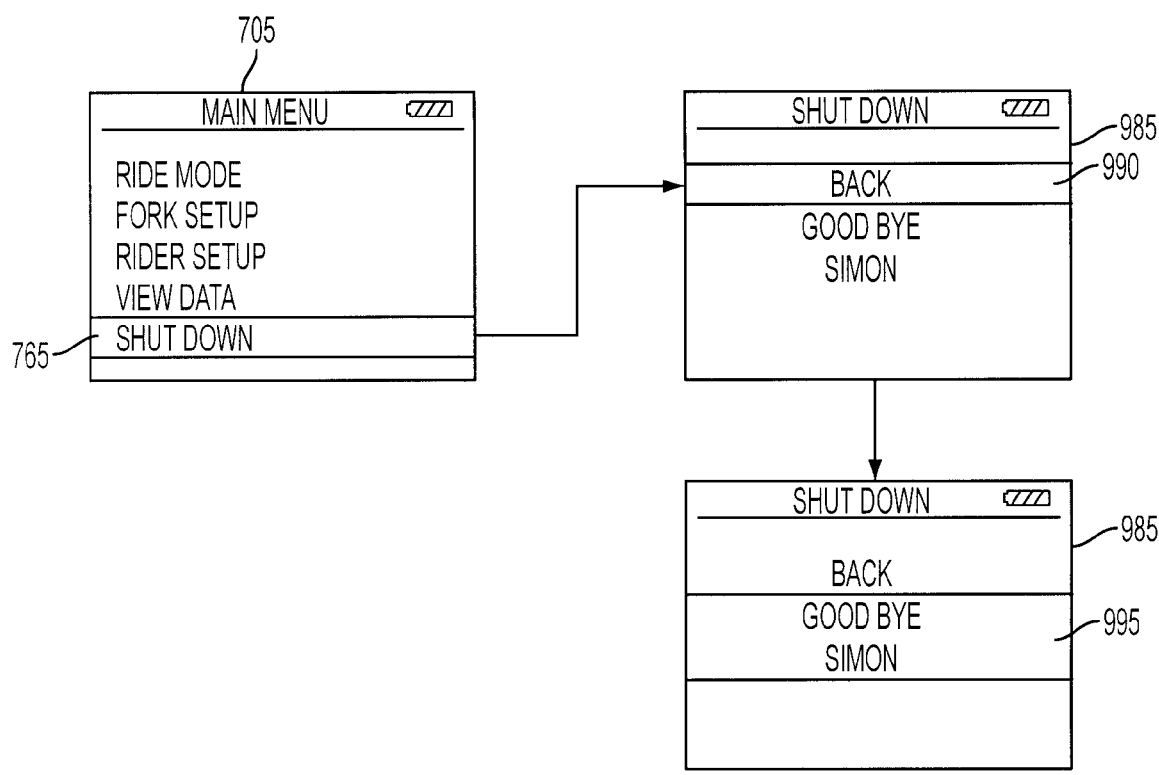
FIG. 24 illustrates the display menu for shutting down the control system of FIG. 13A; and, FIG. 25 illustrates a flow chart diagram of the method of adjusting parameters of the bicycle suspension system for a rider.

Once the rider has completed their activities, it is desirable to shut down the control system 190 to prevent unnecessary drain on the battery 405. By selecting the shut down menu entry 765 the shut down display 985 is displayed as shown in FIG. 24. This display 985 has two menu entries, back entry 990 and good-bye entry 995. If the rider selects the back entry 990, because the rider accidentally entered display 985 for example, the display reverts back to main menu 705. If the rider selects the "Good bye" menu entry 995, the control system initiates a shut down routine.

Figure 25:
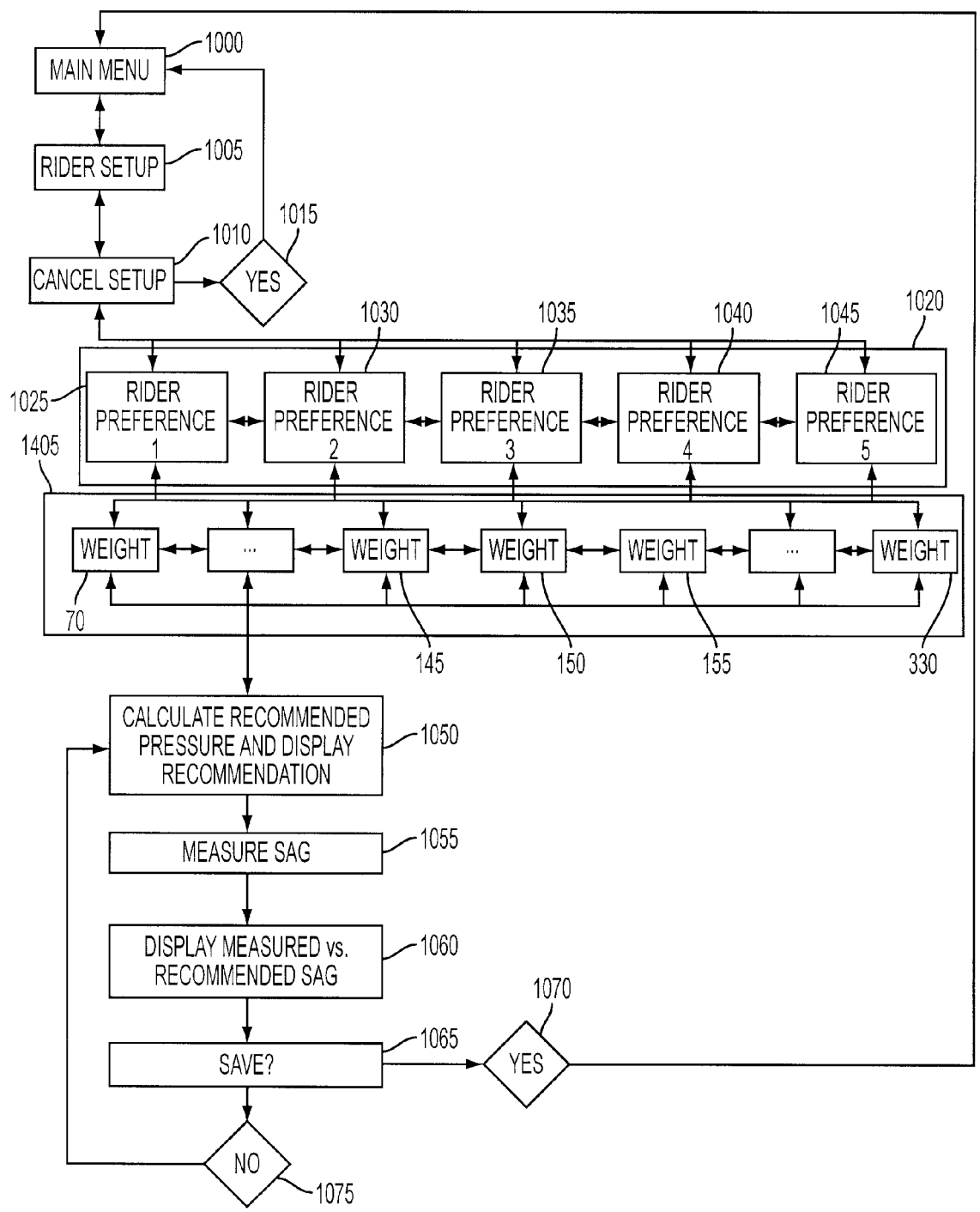

A block flow diagram of the rider setup is illustrated in FIG. 25. From the main menu block 1000, the processor executes instructions when the rider enters the rider setup 1005, by selecting menu entry 755 from the main menu 705 for example. The rider is given the option of canceling the setup in block 1010 and if an affirmative response is received in block 1015, the routine loops back to the main menu 1000. If a negative response is received, the routine continues to block 1020 where the rider stiffness preference is selected, via display 925 for example. Each preference setting 1025, 1030, 1035, 1040, 1045 has a different set of associated damping characteristics that changes the operation of the suspension system 135. The parameter setting selected in block 1020 is stored by the control system 190 in nonvolatile memory device 625 before proceeding to block 1045 where the rider enters their weight, via display 935 for example. The selected weight value entered by the rider is stored in nonvolatile memory device 925 and the routine proceeds to block 1050.

In block 1050, the recommended air pressure is calculated. In the exemplary embodiment, the recommended air pressure is determined using a lookup table that is a function of the rider preference selection and the rider's weight. The routine then displays the recommended air pressure and waits for the rider to acknowledge that the pressure change has occurred before proceeding to block 1055 where the actual amount of static sag due to the rider's weight is measured.

The measured sag and recommended sag are displayed for the rider to review in block 1060. If the rider finds the actual sag to be acceptable, the routine returns to the main menu 1000 via block 1070. If the rider is unsatisfied with the actual amount of sag, the routine loops back to block 1050 via block 1075 to re-execute the process. It should be appreciated that the rider may change different parameters without exiting the routine. For example, the actions of the rider may result in the routine reversing direction, moving from block 1050 to block 1045 and block 1020 for example. The routine may operate in two directions without affecting the process.

The disclosed methods can be embodied in the form of computer or controller implemented processes and apparatuses for practicing those processes. It can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the method. The methods disclosed herein may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

While certain combinations of features relating to a bicycle have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment of the invention. Any and all such combinations are contemplated herein and are considered within the scope of the invention disclosed.

In one embodiment, a bicycle damping system is providing having a valve box with a first and second fluid path. A cylinder having a first and second chamber is coupled to a first shaft. The first shaft is arranged coaxially within the cylinder where a coaxial borehole is fluidly coupled to the valve box first fluid path on a first end of the shaft. The borehole is further fluidly coupled to the first chamber on a second end of the shaft. A second shaft is arranged coaxially and outboard of and coupled to the first shaft. The second shaft is arranged coaxially within the cylinder and includes a borehole fluidly coupled on a first end of the second shaft to the valve box second fluid path. The second shaft borehole is also coupled to the second chamber on a second end of the second shaft. A piston is coupled to the first shaft and arranged to separate the first and second chambers. The piston may further include an orifice that is fluidly coupled to the first chamber and the second chamber. In some embodiments, the valve box is mounted to the first shaft.

In another embodiment, the bicycle damping system includes a first sensor and a controller electrically coupled to the valve box and the sensor. The controller includes a processor that is responsive to executable instructions for controlling the flow of fluid through the valve box in response to a signal from the sensor. The first sensor may be an optical encoder that is coupled to the cylinder. Where the sensor is an optical encoder, the processor is responsive for calculating a position and velocity of the first shaft in response to the signal from the optical encoder. Alternatively, the first sensor may also be an accelerometer that is coupled to a wheel hub.

In another embodiment, the bicycle damping system may further include a second sensor coupled to the cylinder. The second sensor generates a signal indicative of the first shaft position relative to the cylinder. This second sensor may be a Hall effect sensor.

In another embodiment, a bicycle control system is provided. The control system includes a controller having at least one input and at least one output. A battery is electrically coupled to the controller. A first sensor is electrically coupled to the controller. A microcontroller is electrically coupled between the controller and the first sensor. The microcontroller includes a first processor that is responsive for executing instructions to send a first signal to the controller in response to a signal being received by the microcontroller from the first sensor. In yet another embodiment, the bicycle control system further includes a second sensor electrically coupled to the microcontroller. The first processor is further responsive to sending a second signal to the controller in response to a signal being received by the microcontroller from the second sensor. In some embodiments, the controller and battery are sized to fit in a bicycle head tube.

In another embodiment, the controller of the bicycle control system includes a second processor that is responsive for executing instructions for calculating a suspension system parameter in response to receiving the first signal. The controller may then send a third signal representative of the suspension system parameter to the microcontroller. The bicycle control system may further comprise a display mounted to the bicycle steering tube and electrically coupled to the controller. The display may be a liquid crystal display having a resolution of at least 176 pixels in a first direction and at least 132 pixels in a direction perpendicular to the first direction.

The bicycle control system may also include a user input device electrically coupled to the controller. The user input device is movable between at least five different positions. The user input device sends a fourth signal to the controller in response to the user input device being moved to one of the five positions. In one embodiment, the user input device includes a lever having a first position located in a first direction relative to an origin and a second position located in a second direction relative to the origin. The first and second directions are arranged substantially 180 degrees apart.

The lever may also have a third position located in a third direction relative to the origin, and a fourth position located in a fourth direction relative to the origin. The third and fourth directions are 180 degrees apart. The third and fourth directions are also each arranged substantially 90 degrees apart from the first and second directions respectively. In some embodiments, the lever also has a fifth position located at the origin.

As disclosed, some embodiments of the invention may include some of the following advantages: an active control of the suspension system in response to measured terrain conditions; a valve box coupled to the end of a suspension shaft within the upper cylinder of the suspension system; a suspension system with parallel paths for fluid flow to assist with the damping of impacts on the bicycle; a main controller and battery housed within a head tube shielding the components from water and debris; an easy to manipulate user interface that allow operation while riding to allow the rider to interact with the control system without having to look at a display; a distributed control system that includes one or more microcontrollers that provide communications control with sensors arranged on the bicycle to reduce the amount of wiring an assembly costs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A user interface for a bicycle control system for a bicycle, said user interface comprising
    a processor;
    a display coupled to said processor;
    a selection device movable between a first position, a second position and a third position, said selection device generating a first signal in response to said selection device being moved to said first position, generating a second signal in response to said selection device being moved to said second position and generating a third signal in response to said selection device being moved to said third position;
    wherein said processor is responsive to executable computer instructions for displaying a set of menu entries on said display in a first mode of operation and displaying a plurality of graphical elements in a second mode of operation, wherein said second mode of operation is displayed during operation of said bicycle; and,
    wherein said processor is further responsive to moving between said menu entries in response to said first or second signal, said processor being further responsive to displaying a first suspension control setting in response to said third signal.

2. The user interface for a bicycle control system of claim 1 wherein said selection device includes a fourth position and a fifth position, said selection device generating a fourth signal in response to said selection device being moved to said fourth position and a fifth signal in response to said selection device being moved to said fifth position.

3. The user interface for a bicycle control system of claim 2 wherein said selection device includes a lever having a first position located in a first direction relative to an origin, and a second position located in a second direction relative to the origin, wherein said first and second directions are arranged 180 degrees apart.

4. The user interface for a bicycle control system of claim 3 wherein said lever has a fourth position located in a third direction relative to the origin, and a fifth position located in a fourth direction relative to the origin, wherein said third and fourth directions are 180 degrees apart, and said third and fourth directions are each arranged 90 degrees from said first and second direction.

5. The user interface for a bicycle control system of claim 4 wherein:
  said set of menu entries are selected from anyone of: ride mode; fork setup; rider setup; view data; and shut down; and,
  said processor is further responsive to executable instructions for receiving said third signal indicating a ride mode menu selection, and in response to said ride mode menu selection changing to said second mode of operation and generating said plurality of graphical elements on said display, wherein said plurality of graphical elements are positioned on said display in the same relative position as said first position, said second position, said third position, said fourth position and said fifth position on said selection device.

6. The user interface for a bicycle control system of claim 5 wherein:
  said processor is further responsive to executable computer instructions for determining setup parameters associated with a selected fork setup menu and displaying each setup parameter associated with said selected fork setup menu; and,
  said setup parameters include a selection device location parameter.

7. The user interface for a bicycle control system of claim 1 wherein said processor is further responsive to executable computer instructions for transmitting a first signal to a bicycle suspension system in response to receiving said first signal when in said second mode of operation.

8. The user interface for a bicycle control system of claim 7 wherein said processor is further responsive to executable computer instructions for transmitting a second signal to said bicycle suspension system in response to receiving said second signal when in said second mode of operation.

9. The user interface for a bicycle control system of claim 8 wherein said processor is further responsive to executable computer instructions for transmitting a third signal to said bicycle suspension system in response to receiving said third signal when in said second mode of operation, wherein said suspension system locks out in response to receiving said third signal.

10. The user interface for a bicycle control system of claim 1 wherein said processor is further responsive to executable computer instructions for displaying a graphical element and a textual element during a third mode of operation.

11. The user interface for a bicycle control system of claim 10 wherein graphical element is an indicator bar, said indicator bar displaying a second suspension control setting.

12. The user interface of claim 11 wherein said processor is further responsive to executable computer instructions for changing said second control setting in response to said selection device being moved to said first position.

13. The user interface of claim 1 wherein said processor is further responsive to executable computer instructions for displaying a damping curve setting in response to said third signal.

14. The user interface of claim 1 wherein said wherein said processor is further responsive to executable computer instructions for receiving a selection device position parameter, wherein a position of said plurality of graphical elements on said display is reversed in response to receiving said selection device position parameter.

15. The user interface of claim 1 wherein one of said menu entries includes a travel management menu entry, said said processor is further responsive to executable computer instructions for displaying a first graphical element, a second graphical indicator and a control setting text box in response to said third signal, wherein said first graphical element is a representation of a suspension system, and said second graphical element includes a first arrow element and a second arrow element.

\* \* \* \* \*